(12) United States Patent
Robison et al.

(10) Patent No.: US 10,167,865 B2
(45) Date of Patent: *Jan. 1, 2019

(54) HYDRAULIC PUMPING SYSTEM WITH ENHANCED PISTON ROD SEALING

(71) Applicant: WEATHERFORD TECHNOLOGY HOLDINGS, LLC, Houston, TX (US)

(72) Inventors: Clark E. Robison, Tomball, TX (US); Jeffrey J. Lembcke, Cypress, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 306 days.

This patent is subject to a terminal disclaimer.

(21) Appl. No.: 15/162,459

(22) Filed: May 23, 2016

(65) Prior Publication Data

US 2017/0037848 A1     Feb. 9, 2017

Related U.S. Application Data

(63) Continuation-in-part of application No. 14/956,863, filed on Dec. 2, 2015, now Pat. No. 9,903,187, which
(Continued)

(51) Int. Cl.
*F04B 53/14* (2006.01)
*F04B 19/22* (2006.01)
(Continued)

(52) U.S. Cl.
CPC .......... *F04B 53/143* (2013.01); *E21B 43/126* (2013.01); *F04B 9/10* (2013.01);
(Continued)

(58) Field of Classification Search
CPC .............................. F04B 53/146; F04B 53/18; F04B 2201/0802; E21B 33/03; E21B 33/005;
(Continued)

(56) References Cited

U.S. PATENT DOCUMENTS 3,212,406 A   10/1965  McDuffie
3,269,320 A    8/1966  Tilley et al.
(Continued)

FOREIGN PATENT DOCUMENTS

CA   1193345 A    9/1985
CA   2288479 A1   5/2001
(Continued)

OTHER PUBLICATIONS

European Search Report dated May 2, 2017 for EP Patent Application No. 16183123.5-1614/3135859, 6 pages.
(Continued)

*Primary Examiner* — Thomas E Lazo
(74) *Attorney, Agent, or Firm* — Smith IP Services, P.C.

(57) ABSTRACT

A system can include an actuator with a piston rod that displaces in response to pressure in the actuator, a seal assembly that seals about the piston rod and includes seal cartridges, each including a dynamic seal sealingly engaging the rod, and each including a static seal sealingly engaging a seal assembly housing, and a port providing communication between a housing exterior and a housing interior between adjacent static seals. A method can include preventing leakage from a well with a seal assembly about a piston rod of a hydraulic actuator, the seal assembly including seal cartridges, each including a dynamic seal that sealingly engages the rod, and each including a static seal that sealingly engages a seal assembly housing, enabling communication through a housing sidewall to a housing interior between adjacent static seals, and reciprocably displacing the rod in response to pressure variations in the actuator.

20 Claims, 11 Drawing Sheets

Related U.S. Application Data is a continuation-in-part of application No. PCT/US2015/043694, filed on Aug. 5, 2015.

(51) Int. Cl.

| | | |
|---|---|---|
| *F04B 47/02* | (2006.01) | |
| *E21B 43/12* | (2006.01) | |
| *F04B 9/10* | (2006.01) | |
| *F04B 23/00* | (2006.01) | |
| *F04B 41/00* | (2006.01) | |
| *F04B 47/04* | (2006.01) | |
| *F04B 49/06* | (2006.01) | |
| *F04B 51/00* | (2006.01) | |
| *F04B 53/18* | (2006.01) | |
| *G01M 3/28* | (2006.01) | |

(52) U.S. Cl.
CPC .............. *F04B 19/22* (2013.01); *F04B 23/00* (2013.01); *F04B 41/00* (2013.01); *F04B 47/02* (2013.01); *F04B 47/04* (2013.01); *F04B 49/065* (2013.01); *F04B 51/00* (2013.01); *F04B 53/144* (2013.01); *F04B 53/18* (2013.01); *G01M 3/2869* (2013.01); *F04B 2201/0201* (2013.01); *F04B 2205/05* (2013.01)

(58) Field of Classification Search
CPC . E21B 33/02; E21B 3/129; E21B 3/12; E21B 3/126; F16J 15/061; F16J 15/3204; F16J 15/002; F16J 15/004; F16J 15/3276
USPC ........................................................ 92/165 R
See application file for complete search history.

(56) References Cited

U.S. PATENT DOCUMENTS

| | | | |
|---|---|---|---|
| 3,635,081 A | 1/1972 | Gibbs | |
| 3,782,123 A * | 1/1974 | Muschalek, Jr. | F04B 47/04 403/104 |
| 4,167,201 A | 9/1979 | Zahid | |
| 4,178,133 A * | 12/1979 | Rawicki | F04B 43/107 277/320 |
| 4,327,804 A * | 5/1982 | Reed | E21B 33/03 166/88.1 |
| 4,380,150 A | 4/1983 | Carlson | |
| 4,392,792 A | 7/1983 | Rogers | |
| 4,480,685 A | 11/1984 | Gilbertson | |
| 4,487,226 A | 12/1984 | Chun | |
| 4,490,097 A * | 12/1984 | Gilbertson | F04B 47/04 166/68.5 |
| 4,546,607 A | 10/1985 | Kime | |
| 4,646,517 A * | 3/1987 | Wright | F04B 47/04 60/369 |
| 4,691,511 A | 9/1987 | Dollison | |
| 4,707,993 A | 11/1987 | Kime | |
| 4,736,674 A | 4/1988 | Stoll | |
| 4,762,473 A | 8/1988 | Tieben | |
| 4,788,851 A | 12/1988 | Brault | |
| 4,848,085 A | 7/1989 | Rosman | |
| 5,079,997 A | 1/1992 | Hong | |
| 5,184,507 A | 2/1993 | Drake | |
| 5,209,495 A * | 5/1993 | Palmour | F04B 53/164 277/500 |
| 5,281,100 A | 1/1994 | Diederich | |
| 5,431,230 A | 7/1995 | Land et al. | |
| 5,447,026 A * | 9/1995 | Stanley | F04B 9/105 277/322 |
| 5,481,873 A | 1/1996 | Saruwatari et al. | |
| 5,628,516 A * | 5/1997 | Grenke | E21B 33/085 277/300 |
| 5,755,372 A * | 5/1998 | Cimbura, Sr. | E21B 33/08 277/318 |
| 5,996,688 A | 12/1999 | Schultz et al. | |
| 6,346,806 B1 | 2/2002 | Schabuble et al. | |
| 6,789,458 B2 | 9/2004 | Schumacher et al. | |
| 6,817,252 B2 | 11/2004 | Wiklund et al. | |
| 7,255,163 B2 * | 8/2007 | Rivard | E21B 33/085 166/76.1 |
| 7,293,496 B2 | 11/2007 | Nassif | |
| 7,600,563 B2 | 10/2009 | Brecheisen | |
| 7,775,776 B2 | 8/2010 | Bolding | |
| 8,066,496 B2 * | 11/2011 | Brown | E21B 43/127 166/105 |
| 8,083,499 B1 | 12/2011 | Krug et al. | |
| 8,156,953 B2 | 4/2012 | Tveita | |
| 8,336,613 B2 | 12/2012 | Ramsey et al. | |
| 8,444,393 B2 | 5/2013 | Beck et al. | |
| 8,523,533 B1 | 9/2013 | Best | |
| 8,613,317 B2 | 12/2013 | Briquet et al. | |
| 8,851,860 B1 | 10/2014 | Mail | |
| 9,115,705 B2 | 8/2015 | Best | |
| 9,279,432 B2 | 3/2016 | Jirgal et al. | |
| 9,429,001 B2 | 8/2016 | Best | |
| 9,541,099 B2 | 1/2017 | Pekarsky et al. | |
| 9,745,975 B2 | 8/2017 | Dancek | |
| 2004/0062657 A1 | 4/2004 | Beck et al. | |
| 2004/0112586 A1 | 6/2004 | Matthews et al. | |
| 2005/0087068 A1 * | 4/2005 | Nagai | F04B 1/2014 92/153 |
| 2005/0142012 A1 | 6/2005 | Padgett et al. | |
| 2007/0056747 A1 * | 3/2007 | Jacob | E21B 33/10 166/386 |
| 2008/0118382 A1 | 5/2008 | Ramsey et al. | |
| 2009/0121440 A1 * | 5/2009 | Feistel | F04B 39/041 277/308 |
| 2009/0194291 A1 * | 8/2009 | Fesi | E21B 43/126 166/369 |
| 2011/0284204 A1 | 11/2011 | Bertane et al. | |
| 2012/0247754 A1 | 10/2012 | Wright et al. | |
| 2012/0247785 A1 | 10/2012 | Schmitt | |
| 2012/0315155 A1 | 12/2012 | Rogers et al. | |
| 2013/0043037 A1 | 2/2013 | Ramsey et al. | |
| 2013/0151216 A1 | 6/2013 | Palka et al. | |
| 2014/0079560 A1 | 3/2014 | Hodges et al. | |
| 2014/0102796 A1 | 4/2014 | Veneruso et al. | |
| 2014/0231093 A1 | 8/2014 | Hoell | |
| 2014/0262259 A1 | 9/2014 | Fouillard et al. | |
| 2014/0294603 A1 | 10/2014 | Best | |
| 2014/0328664 A1 | 11/2014 | Hearn | |
| 2015/0078926 A1 | 3/2015 | Krug et al. | |
| 2015/0285041 A1 | 10/2015 | Dancek | |
| 2015/0345802 A1 | 12/2015 | Van Haaren et al. | |
| 2017/0037713 A1 | 2/2017 | Trapani et al. | |

FOREIGN PATENT DOCUMENTS

| | | |
|---|---|---|
| CA | 2436924 A1 | 9/2004 |
| CA | 2515616 A1 | 2/2006 |
| CA | 2526345 A1 | 4/2007 |
| CA | 2826593 A1 | 3/2014 |
| WO | 9734095 A1 | 9/1997 |
| WO | 2004092539 A1 | 10/2004 |
| WO | 2009/097338 A2 | 8/2009 |
| WO | 2013063591 A2 | 5/2013 |

OTHER PUBLICATIONS

Canadian Office Action dated Jun. 16, 2017 for CA Patent Application No. 2,936,220, 6 pages.
Canadian Office Action dated Jun. 15, 2017 for CA Patent Application No. 2,936,221, 5 pages.
Canadian Office Action dated Jun. 19, 2017 for CA Patent Application No. 2,936,322, 5 pages.
Canadian Office Action dated Jun. 21, 2017 for CA Patent Application No. 2,936,302, 5 pages.
Canadian Office Action dated Jul. 4, 2017 for CA Patent Application No. 2,936,320, 6 pages.
Office Action dated Sep. 8, 2017 for U.S. Appl. No. 14/947,839, 41 pages.

(56) References Cited

OTHER PUBLICATIONS

Office Action dated Sep. 8, 2017 for U.S. Appl. No. 14/991,253, 47 pages.
Hua, C.; "Sucker Rod String Design of the Pumping Systems", Indenieria E Investigacion vol. 35, dated Aug. 2, 2015, 9 pages.
European Examination Report dated Oct. 23, 2017 for EP Patent Application No. 16183105.2, 5 pages.
Notice of Allowance dated Nov. 2, 2017 for U.S. Appl. No. 14/956,863, 30 pages.
Canadian Office Action dated Nov. 8, 2017 for CA Patent Application No. 2,936,221, 3 pages.
Office Action dated Nov. 13, 2017 for U.S. Appl. No. 14/956,527, 49 pages.
Office Action dated Feb. 23, 2018 for U.S. Appl. No. 14/956,545, 46 pages.
Office Action dated Jan. 26, 2018 for U.S. Appl. No. 14/991,253, 55 pages.
European Examination Report dated Mar. 15, 2018 for EP Patent Application No. 16183105.2, 5 pages.
European Examination Report dated Mar. 15, 2018 for EP Patent Application No. 16183114.4, 5 pages.
European Examination Report dated Mar. 15, 2018 for EP Patent Application No. 16183126.8, 7 pages.
Office Action dated Apr. 9, 2018 for U.S. Appl. No. 14/956,601, 52 pages.
Office Action dated Apr. 6, 2018 for U.S. Appl. No. 14/956,527, 30 pages.
European Search Report dated Dec. 14, 2016 for EP Patent Application No. 16183125.0, 9 pages.
Specification and Drawings for U.S. Appl. No. 14/991,253, filed Jan. 8, 2016, 49 pages.
International Search Report with Written Opinion dated Jan. 20, 2016 for PCT Patent Application No. PCT/US15/43694, 13 pages.
Specification and Drawings for International Patent Application No. PCT/US15/43694, filed Aug. 5, 2015, 54 pages.
Smalley; "Laminar Seal Rings", company article, pp. 103-109, received Oct. 20, 2015, 7 pages.
Weatherford; RamPump, company brochure 800.03, dated 2005-2006, 4 pages.
Omega; "High Performance Pressure Transducer, Stainless Steel Construction, Silicon Technology", product description via website http://www.omega.com/pptst/PX309-100MV.html, dated May 10, 2016, 7 pages.
Neptune Oceanographics; "Hydrocarbon Leak Detection", web article, dated May 10, 2016, 2 pages.
Omega; "Level Measurement", product description via website http://www.omega.com/prodinfo/levelmeasurement.html, dated May 10, 2016, 3 pages.
European Search Report dated Feb. 17, 2017 for EP Patent Application No. 16199698.8, 6 pages.
European Search Report dated May 2, 2017 for EP Patent Application No. 16183114.4, 14 pages.
T.A. Everitt et al; "An Improved Finite-Difference Calculation of Downhole Dynamometer Cards for Sucker-Rod Pumps", SPE Production Engineering, vol. 7, No. 01, dated Feb. 1, 1992, 7 pages.
European Search Report dated May 4, 2017 for EP Patent Application No. 16199697.0, 7 pages.
European Examination Report dated Jul. 17, 2018 for EP Patent Application No. 16 199 697.0, 5 pages.
European Examination Report dated Jul. 17, 2018 for EP Patent Application No. 16 199 698.8, 5 pages.
Canadian Office Action dated Apr. 13, 2018 for CA Patent Application No. 2,936,221, 4 pages.

* cited by examiner

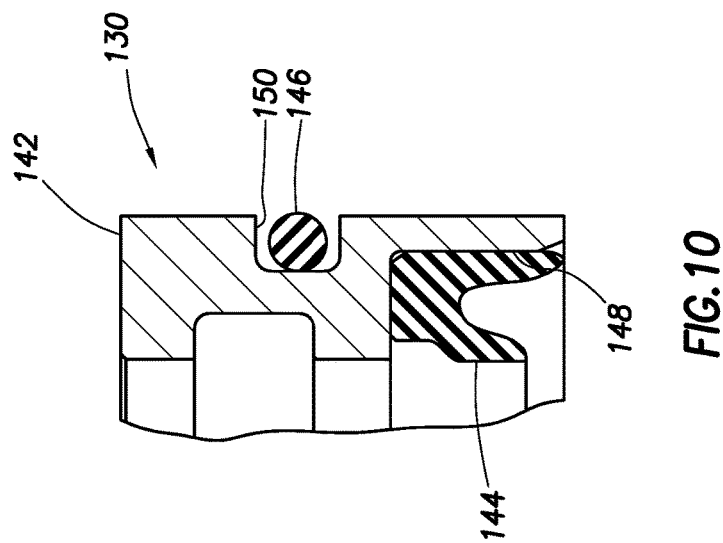
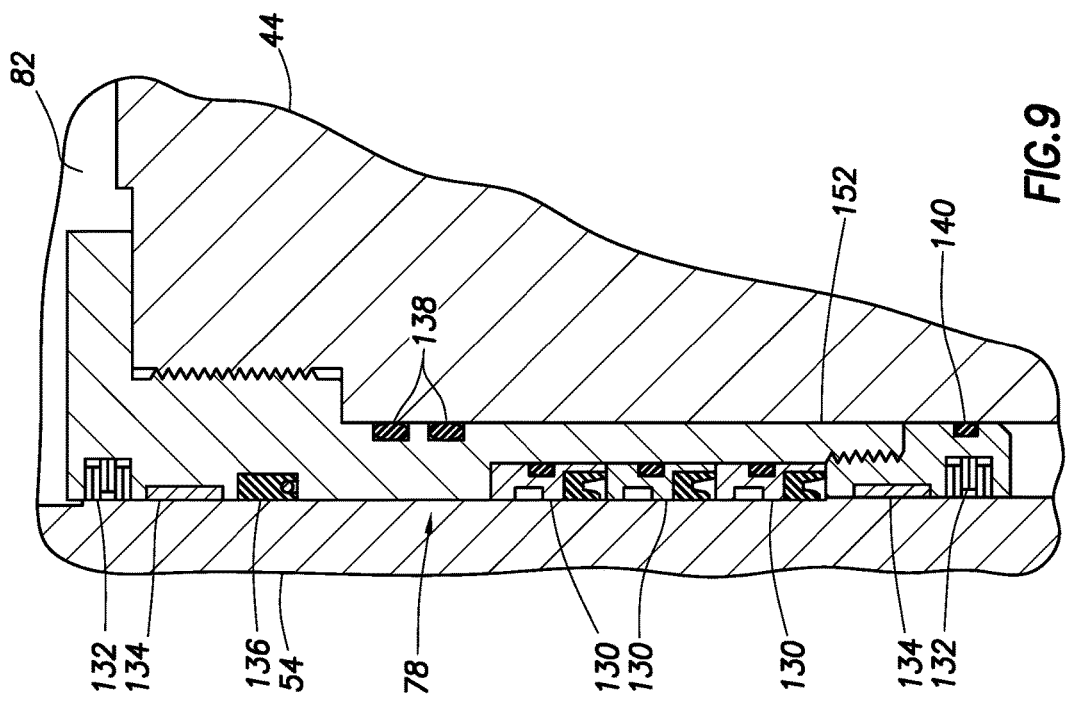

HYDRAULIC PUMPING SYSTEM WITH ENHANCED PISTON ROD SEALING

CROSS-REFERENCE TO RELATED APPLICATIONS

This application is a continuation-in-part of prior U.S. application Ser. No. 14/956,863, filed on 2 Dec. 2015, which is a continuation-in-part of International Application No. PCT/US15/43694 filed on 5 Aug. 2015. The entire disclosures of these prior applications are incorporated herein by this reference for all purposes.

BACKGROUND

This disclosure relates generally to equipment utilized and operations performed in conjunction with a subterranean well and, in one example described below, more particularly provides a hydraulic pumping system.

Reservoir fluids can sometimes flow to the earth's surface when a well has been completed. However, with some wells, reservoir pressure may be insufficient (at the time of well completion or thereafter) to lift the fluids (in particular, liquids) to the surface. In those circumstances, technology known as "artificial lift" can be employed to bring the fluids to the surface (or other desired location, such as a subsea production facility or pipeline, etc.).

Various types of artificial lift technology are known to those skilled in the art. In one type of artificial lift, a downhole pump is operated by reciprocating a string of "sucker" rods deployed in a well. An apparatus (such as, a walking beam-type pump jack or a hydraulic actuator) located at the surface can be used to reciprocate the rod string.

Therefore, it will be readily appreciated that improvements are continually needed in the arts of constructing and operating artificial lift systems. Such improvements may be useful for lifting oil, water, gas condensate or other liquids from wells, may be useful with various types of wells (such as, gas production wells, oil production wells, water or steam flooded oil wells, geothermal wells, etc.), and may be useful for any other application where reciprocating motion is desired.

BRIEF DESCRIPTION OF THE DRAWINGS

FIG. 9 is an enlarged scale representative cross-sectional view of an example of a seal assembly that may be used with the hydraulic pumping system and associated method.

FIG. 10 is a further enlarged scale representative cross-sectional view of a seal cartridge of the FIG. 9 seal assembly.

DETAILED DESCRIPTION

Figure 1:
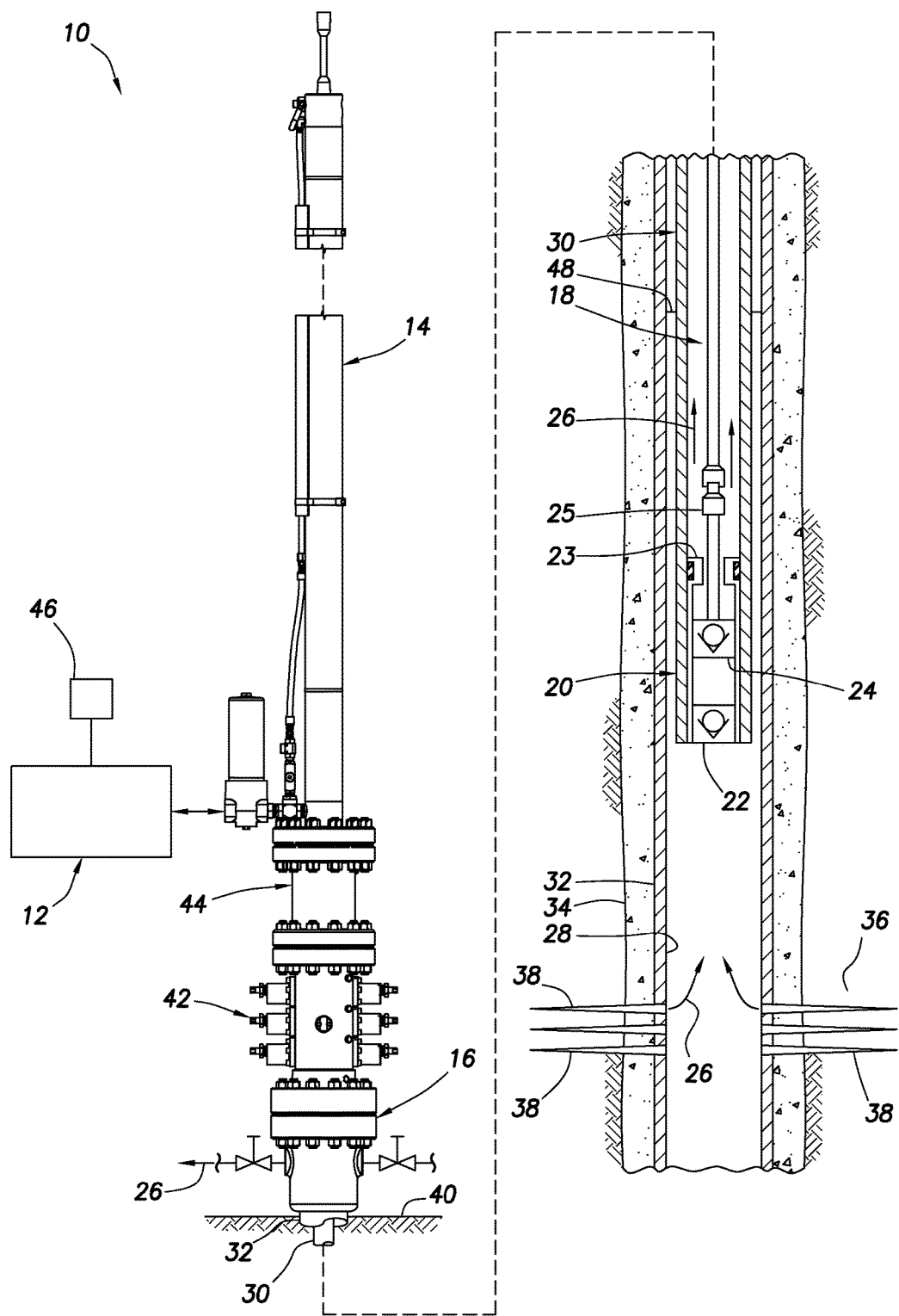
FIG. 1 is a representative partially cross-sectional view of an example of a hydraulic pumping system and associated method which can embody principles of this disclosure.

Representatively illustrated in FIG. 1 is a hydraulic pumping system 10 and associated method for use with a subterranean well, which system and method can embody principles of this disclosure. However, it should be clearly understood that the hydraulic pumping system 10 and method are merely one example of an application of the principles of this disclosure in practice, and a wide variety of other examples are possible. Therefore, the scope of this disclosure is not limited at all to the details of the system 10 and method as described herein or depicted in the drawings.

In the FIG. 1 example, a hydraulic pressure source 12 is used to apply hydraulic pressure to, and exchange hydraulic fluid with, a hydraulic actuator 14 mounted on a wellhead 16. In response, the hydraulic actuator 14 reciprocates a rod string 18 extending into the well, thereby operating a downhole pump 20.

The rod string 18 may be made up of individual sucker rods connected to each other, although other types of rods or tubes may be used, the rod string 18 may be continuous or segmented, a material of the rod string 18 may comprise steel, composites or other materials, and elements other than rods may be included in the string. Thus, the scope of this disclosure is not limited to use of any particular type of rod string, or to use of a rod string at all. It is only necessary for purposes of this disclosure to communicate reciprocating motion of the hydraulic actuator 14 to the downhole pump 20, and it is therefore within the scope of this disclosure to use any structure capable of such transmission.

The downhole pump 20 is depicted in FIG. 1 as being of the type having a stationary or "standing" valve 22 and a reciprocating or "traveling" valve 24. The traveling valve 24 is connected to, and reciprocates with, the rod string 18, so that fluid 26 is pumped from a wellbore 28 into a production tubing string 30. However, it should be clearly understood that the downhole pump 20 is merely one example of a wide variety of different types of pumps that may be used with the hydraulic pumping system 10 and method of FIG. 1, and so the scope of this disclosure is not limited to any of the details of the downhole pump described herein or depicted in the drawings.

The wellbore 28 is depicted in FIG. 1 as being generally vertical, and as being lined with casing 32 and cement 34. In other examples, a section of the wellbore 28 in which the pump 20 is disposed may be generally horizontal or otherwise inclined at any angle relative to vertical, and the wellbore section may not be cased or may not be cemented. Thus, the scope of this disclosure is not limited to use of the hydraulic pumping system 10 and method with any particular wellbore configuration.

In the FIG. 1 example, the fluid 26 originates from an earth formation 36 penetrated by the wellbore 28. The fluid 26 flows into the wellbore 28 via perforations 38 extending through the casing 32 and cement 34. The fluid 26 can be a liquid, such as oil, gas condensate, water, etc. However, the scope of this disclosure is not limited to use of the hydraulic pumping system 10 and method with any particular type of fluid, or to any particular origin of the fluid.

As depicted in FIG. 1, the casing 32 and the production tubing string 30 extend upward to the wellhead 16 at or near the earth's surface 40 (such as, at a land-based wellsite, a subsea production facility, a floating rig, etc.). The production tubing string 30 can be hung off in the wellhead 16, for example, using a tubing hanger (not shown). Although only a single string of the casing 32 is illustrated in FIG. 1 for clarity, in practice multiple casing strings and optionally one or more liner (a liner string being a pipe that extends from a selected depth in the wellbore 28 to a shallower depth, typically sealingly "hung off" inside another pipe or casing) strings may be installed in the well.

In the FIG. 1 example, a rod blowout preventer stack 42 and an annular seal housing 44 are connected between the hydraulic actuator 14 and the wellhead 16. The rod blowout preventer stack 42 includes various types of blowout preventers (BOP's) configured for use with the rod string 18. For example, one blowout preventer can prevent flow through the blowout preventer stack 42 when the rod string 18 is not present therein, and another blowout preventer can prevent flow through the blowout preventer stack 42 when the rod string 18 is present therein. However, the scope of this disclosure is not limited to use of any particular type or configuration of blowout preventer stack with the hydraulic pumping system 10 and method of FIG. 1.

The annular seal housing 44 includes an annular seal (described more fully below) about a piston rod of the hydraulic actuator 14. The piston rod (also described more fully below) connects to the rod string 18 below the annular seal, although in other examples a connection between the piston rod and the rod string 18 may be otherwise positioned.

The hydraulic pressure source 12 may be connected directly to the hydraulic actuator 14, or it may be positioned remotely from the hydraulic actuator 14 and connected with, for example, suitable hydraulic hoses or pipes. Operation of the hydraulic pressure source 12 is controlled by a control system 46.

The control system 46 may allow for manual or automatic operation of the hydraulic pressure source 12, based on operator inputs and measurements taken by various sensors. The control system 46 may be separate from, or incorporated into, the hydraulic pressure source 12. In one example, at least part of the control system 46 could be remotely located or web-based, with two-way communication between the hydraulic pressure source 12 and the control system 46 being via, for example, satellite, wireless or wired transmission.

The control system 46 can include various components, such as a programmable controller, input devices (e.g., a keyboard, a touchpad, a data port, etc.), output devices (e.g., a monitor, a printer, a recorder, a data port, indicator lights, alert or alarm devices, etc.), a processor, software (e.g., an automation program, customized programs or routines, etc.) or any other components suitable for use in controlling operation of the hydraulic pressure source 12. The scope of this disclosure is not limited to any particular type or configuration of a control system.

In operation of the hydraulic pumping system 10 of FIG. 1, the control system 46 causes the hydraulic pressure source 12 to increase pressure applied to the hydraulic actuator 14 (delivering a volume of hydraulic fluid into the hydraulic actuator), in order to raise the rod string 18. Conversely, the hydraulic pressure source 12 receives a volume of hydraulic fluid from the hydraulic actuator 14 (thereby decreasing pressure applied to the hydraulic actuator), in order to allow the rod string 18 to descend. Thus, by alternately increasing and decreasing pressure in the hydraulic actuator 14, the rod string 18 is reciprocated, the downhole pump 20 is actuated and the fluid 26 is pumped out of the well.

Note that, when pressure in the hydraulic actuator 14 is decreased to allow the rod string 18 to displace downward (as viewed in FIG. 1), the pressure is not decreased to zero gauge pressure (e.g., atmospheric pressure). Instead, a "balance" pressure is maintained in the hydraulic actuator 14 to nominally offset a load due to the rod string 18 being suspended in the well (e.g., a weight of the rod string, taking account of buoyancy, inclination of the wellbore 28, friction, well pressure, etc.).

In this manner, the hydraulic pressure source 12 is not required to increase pressure in the hydraulic actuator 14 from zero to that necessary to displace the rod string 18 upwardly (along with the displaced fluid 26), and then reduce the pressure back to zero, for each reciprocation of the rod string 18. Instead, the hydraulic pressure source 12 only has to increase pressure in the hydraulic actuator 14 sufficiently greater than the balance pressure to displace the rod string 18 to its upper stroke extent, and then reduce the pressure in the hydraulic actuator 14 back to the balance pressure to allow the rod string 18 to displace back to its lower stroke extent.

Note that it is not necessary for the balance pressure in the hydraulic actuator 14 to exactly offset the load exerted by the rod string 18. In some examples, it may be advantageous for the balance pressure to be somewhat less than that needed to offset the load exerted by the rod string 18. In addition, it can be advantageous in some examples for the balance pressure to change over time. Thus, the scope of this disclosure is not limited to use of any particular or fixed balance pressure, or to any particular relationship between the balance pressure, any other force or pressure and/or time.

A reciprocation speed of the rod string 18 will affect a flow rate of the fluid 26. Generally speaking, the faster the reciprocation speed at a given length of stroke of the rod string 18, the greater the flow rate of the fluid 26 from the well (to a point).

It can be advantageous to control the reciprocation speed, instead of reciprocating the rod string 18 as fast as possible. For example, a fluid interface 48 in the wellbore 28 can be affected by the flow rate of the fluid 26 from the well. The fluid interface 48 could be an interface between oil and water, gas and water, gas and gas condensate, gas and oil, steam and water, or any other fluids or combination of fluids.

If the flow rate is too great, the fluid interface 48 may descend in the wellbore 28, so that eventually the pump 20 will no longer be able to pump the fluid 26 (a condition known to those skilled in the art as "pump-off"). On the other hand, it is typically desirable for the flow rate of the fluid 26 to be at a maximum level that does not result in pump-off. In addition, a desired flow rate of the fluid 26 may change over time (for example, due to depletion of a reservoir, changed offset well conditions, water or steam flooding characteristics, etc.).

A "gas-locked" downhole pump 20 can result from a pump-off condition, whereby gas is received into the downhole pump 20. The gas is alternately expanded and compressed in the downhole pump 20 as the traveling valve 24 reciprocates, but the fluid 26 cannot flow into the downhole pump 20, due to the gas therein.

In the FIG. 1 hydraulic pumping system 10 and method, the control system 46 can automatically control operation of the hydraulic pressure source 12 to regulate the reciprocation speed, so that pump-off is avoided, while achieving any of various desirable objectives. Those objectives may include maximum flow rate of the fluid 26, optimized rate of electrical power consumption, reduction of peak electrical loading, etc. However, it should be clearly understood that the scope of this disclosure is not limited to pursuing or achieving any particular objective or combination of objectives via automatic reciprocation speed regulation by the control system 46.

As mentioned above, the hydraulic pressure source 12 controls pressure in the hydraulic actuator 14, so that the rod string 18 is displaced alternately to its upper and lower stroke extents. These extents do not necessarily correspond to maximum possible upper and lower displacement limits of the rod string 18 or the pump 20.

For example, it is typically undesirable for a valve rod bushing 25 above the traveling valve 24 to impact a valve rod guide 23 above the standing valve 22 when the rod string 18 displaces downwardly (a condition known to those skilled in the art as "pump-pound"). Thus, it is preferred that the rod string 18 be displaced downwardly only until the valve rod bushing 25 is near its maximum possible lower displacement limit, so that it does not impact the valve rod guide 23.

On the other hand, the longer the stroke distance (without impact), the greater the productivity and efficiency of the pumping operation (within practical limits), and the greater the compression of fluid between the standing and traveling valves 22, 24 (e.g., to avoid gas-lock). In addition, a desired stroke of the rod string 18 may change over time (for example, due to gradual lengthening of the rod string 18 as a result of lowering of a liquid level (such as at fluid interface 48) in the well, etc.).

In the FIG. 1 hydraulic pumping system 10 and method, the control system 46 can automatically control operation of the hydraulic pressure source 12 to regulate the upper and lower stroke extents of the rod string 18, so that pump-pound is avoided, while achieving any of various desirable objectives. Those objectives may include maximizing rod string stroke length, maximizing production, minimizing electrical power consumption rate, minimizing peak electrical loading, etc. However, it should be clearly understood that the scope of this disclosure is not limited to pursuing or achieving any particular objective or combination of objectives via automatic stroke extent regulation by the control system 46.

Figure 2:
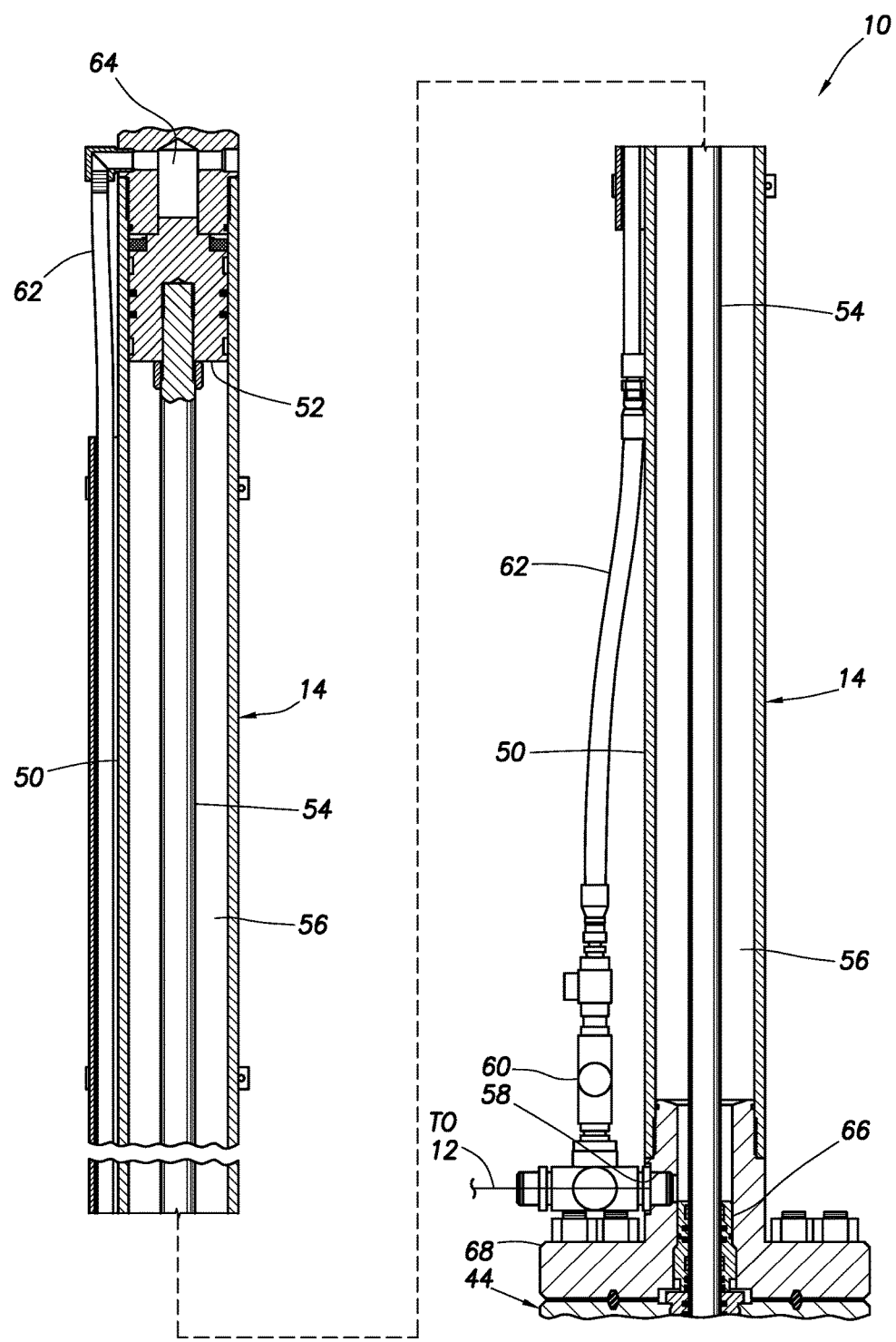
FIG. 2 is a representative cross-sectional view of an example of a hydraulic actuator that may be used in the system and method of FIG. 1.

Referring additionally now to FIG. 2, an enlarged scale cross-sectional view of an example of the hydraulic actuator 14 as used in the hydraulic pumping system 10 is representatively illustrated. Note that the hydraulic actuator 14 of FIG. 2 may be used with other systems and methods, in keeping with the principles of this disclosure.

As depicted in FIG. 2, the hydraulic actuator 14 includes a generally tubular cylinder 50, a piston 52 sealingly and reciprocably disposed in the cylinder 50, and a piston rod 54 connected to the piston 52. The piston 52 and piston rod 54 displace relative to the cylinder 50 in response to a pressure differential applied across the piston 52.

Hydraulic fluid and pressure are communicated between the hydraulic pressure source 12 and an annular chamber 56 in the cylinder 50 below the piston 52 via a port 58. A vent valve 60 is connected via a tubing 62 to an upper chamber 64 above the piston 52. The upper chamber 64 is maintained at substantially atmospheric pressure (zero gauge pressure), and pressure in the annular chamber 56 is controlled by the hydraulic pressure source 12, in order to control displacement of the piston 52 and piston rod 54 (and the rod string 18 connected thereto).

Note that, in this example, an annular seal assembly 66 is sealingly received in a lower flange 68 of the hydraulic actuator 14. The annular seal assembly 66 also sealingly engages an outer surface of the piston rod 54. Thus, a lower end of the annular chamber 56 is sealed off by the annular seal assembly 66.

In FIG. 2, the piston 52 is at a maximum possible upper limit of displacement. However, during a pumping operation, the piston 52 may not be displaced to this maximum possible upper limit of displacement. For example, as discussed above, an upper stroke extent of the rod string 18 may be regulated to achieve various objectives.

Similarly, during a pumping operation, the piston 52 also may not be displaced to a maximum possible lower limit of displacement. As described more fully below, upper and lower extents of displacement of the piston 52 and rod 54 can be varied to produce corresponding changes in the upper and lower stroke extents of the rod string 18, in order to achieve various objectives (such as, preventing pump-off, preventing pump-pound, optimizing pumping efficiency, reducing peak electrical loading, etc.).

Figure 3:
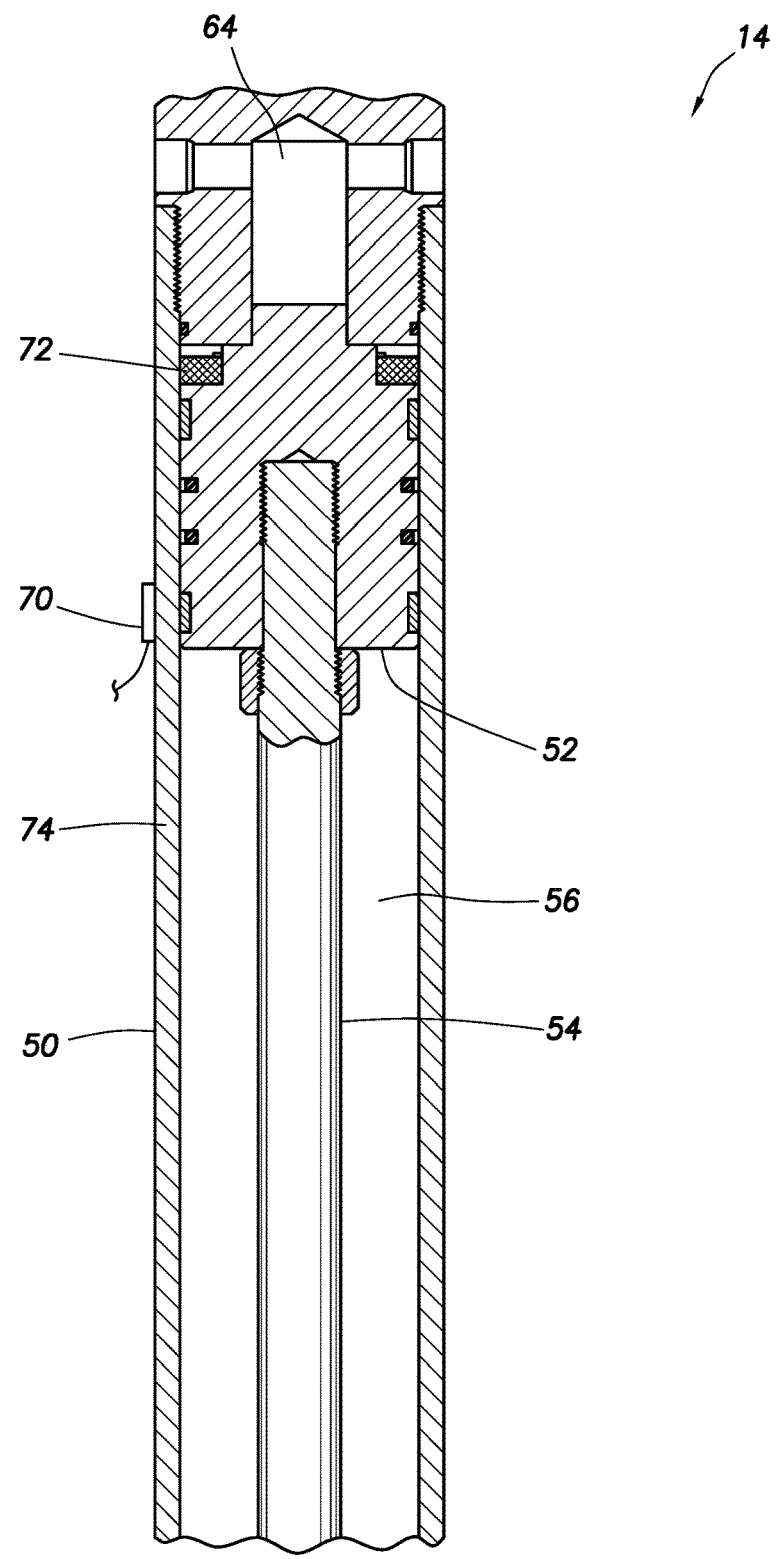
FIG. 3 is a representative cross-sectional view of an example piston position sensing technique that may be used in the system and method of FIG. 1.

Referring additionally now to FIG. 3, a further enlarged scale cross-sectional view of an upper portion of the hydraulic actuator 14 is representatively illustrated. This view is rotated somewhat about a vertical axis of the hydraulic actuator 14 (as compared to FIG. 2), so that a sensor 70, for example, a magnetic field sensor, is visible in FIG. 3.

The sensor 70 is secured to an outer surface of the cylinder 50 (for example, using a band clamp). In other examples, the sensor 70 could be bonded, threaded or otherwise attached to the cylinder 50, or could be incorporated into the cylinder or another component of the hydraulic actuator 14.

In some examples, a position of the sensor 70 relative to the cylinder 50 can be adjustable. The sensor 70 could be movable longitudinally along the cylinder 50, for example, via a threaded rod or another type of linear actuator.

A suitable magnetic field sensor is a Pepperl MB-F32-A2 magnetic flux sensing switch marketed by Pepperl+Fuchs North America of Twinsburg, Ohio USA. However, other magnetic field sensors may be used in keeping with the principles of this disclosure.

The sensor 70 (when a magnetic field sensor is used) is capable of sensing a presence of a magnet 72 through a wall 74 of the cylinder 50. The magnet 72 is secured to, and displaces with, the piston 52. In some examples, the sensor 70 can sense the presence of the magnet 72, even though the wall 74 comprises a ferromagnetic material (such as steel), and even though the wall is relatively thick (such as, approximately 1.27 cm or greater thickness).

A suitable magnet for use in the actuator 14 is a neodymium magnet (such as, a neodymium-iron-boron magnet) in ring form. However, other types and shapes of magnets may be used in keeping with the principles of this disclosure.

Although only one sensor 70 is visible in FIG. 3, it is contemplated that any number of sensors could be used with the hydraulic actuator 14. The sensors 70 could be distributed in a variety of different manners along the cylinder 50 (e.g., linearly, helically, evenly spaced, unevenly spaced, etc.).

In the FIG. 3 example, an output of the sensor 70 is communicated to the control system 46, so that a position of the piston 52 at any given point in the pumping operation is determinable. As the number of sensors 70 is increased, determination of the position of the piston 52 at any given point in the pumping operation can become more accurate.

For example, two of the sensors 70 could be positioned on the cylinder 50, with one sensor at a position corresponding to an upper stroke extent of the piston 52 and magnet 72, and the other sensor at a position corresponding to a lower stroke extent of the piston and magnet. When a sensor 70 detects that the piston 52 and magnet 72 have displaced to the corresponding stroke extent (by sensing the proximate presence of the magnet 72), the control system 46 appropriately reverses the stroke direction of the piston 52 by operation of hydraulic components to be described further below. In this example, the upper and lower stroke extents of the piston 52 can be conveniently varied by adjusting the longitudinal positions of the sensors 70 on the cylinder 50.

Figure 4:
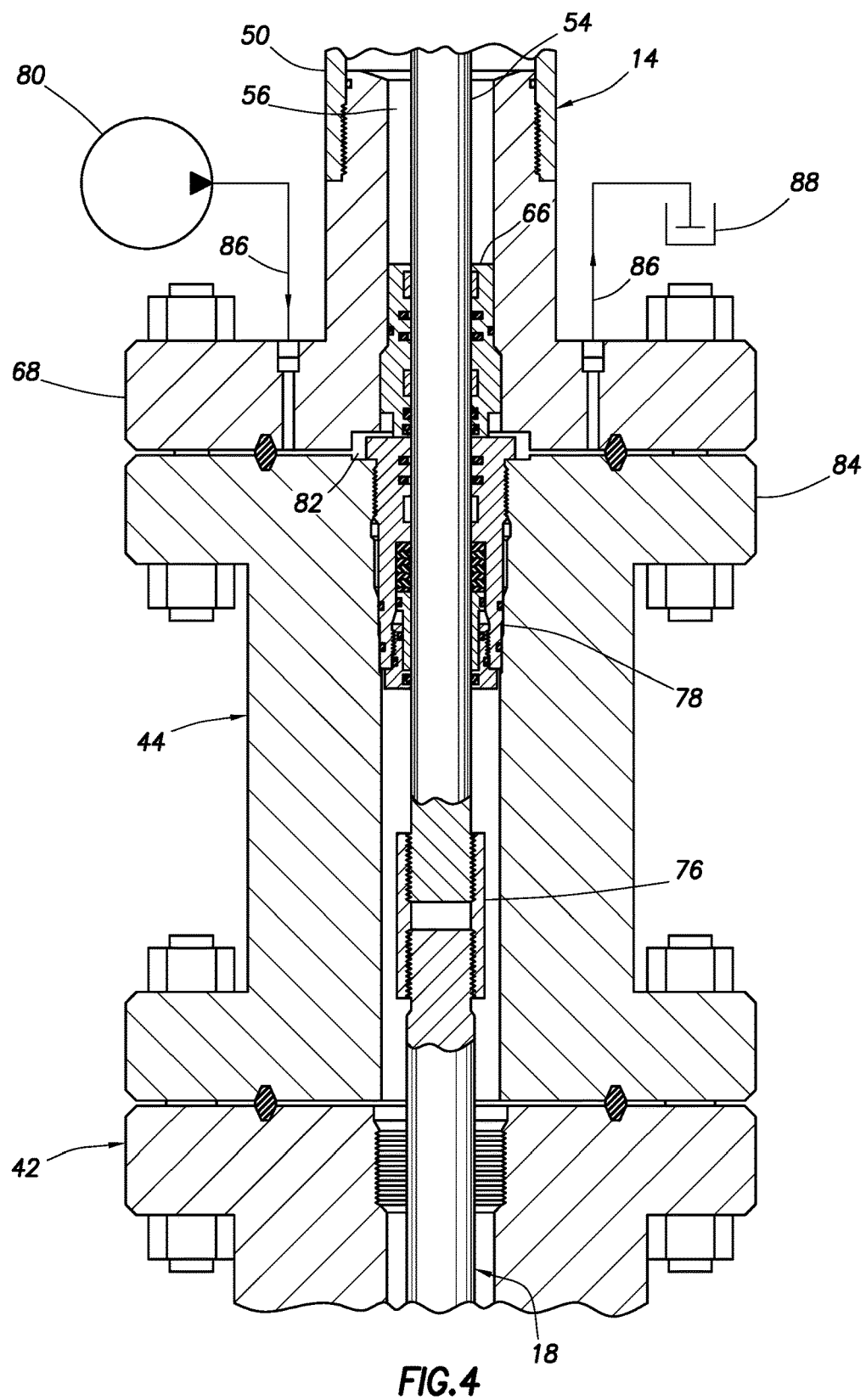
FIG. 4 is a representative cross-sectional view of an example lower portion of the hydraulic actuator and an annular seal housing.

Referring additionally now to FIG. 4, a cross-sectional view of a lower portion of the hydraulic actuator 14, the annular seal housing 44 and an upper flange of the BOP stack 42 is representatively illustrated. In this view, a threaded connection 76 between the piston rod 54 and the rod string 18 can be seen in the annular seal housing 44 below an annular seal assembly 78.

The annular seal assembly 78 seals off an annular space between the exterior surface of the piston rod 54 and an interior surface of the annular seal housing 44. The annular seal assembly 78 is similar in some respects to the annular seal assembly 66 in the hydraulic actuator 14, but the annular seal assembly 78 shown in FIG. 4 is exposed to pressure in the well (when the rod BOP's are not actuated), whereas the annular seal assembly (66 in FIG. 3) is exposed to pressure in the annular chamber (56 in FIG. 3) of the hydraulic actuator 14.

A lubricant injector 80 slowly pumps grease or another lubricant 86 into an annular chamber 82 formed in the lower flange 68 of the hydraulic actuator 14 and an upper flange 84 of the annular seal housing 44. The lubricant 86 flows out of the annular chamber 82 to a reservoir 88. In one example, the lubricant 86 could be sourced from the hydraulic fluid in the annular chamber (56 in FIG. 3) or the hydraulic pressure source (12 in FIG. 1).

An advantage of having the lubricant 86 flow through the annular chamber 82 is that, if well fluid leaks past the annular seal assembly 78, or if hydraulic fluid leaks past the annular seal assembly (66 in FIG. 3), it will be apparent in the lubricant delivered to the reservoir 88. However, it is not necessary for the lubricant injector 80 to deliver pressurized lubricant 86 into the annular chamber 82 in keeping with the scope of this disclosure. For example, the lubricant 86 could instead be delivered from an unpressurized reservoir by gravity flow, etc.

An advantage of having the annular seal assemblies 66, 78 in the flanges 68, 84 is that they are both accessible by separating the flanges 68, 84 (for example, when the hydraulic actuator 14 is removed from the annular seal housing 44 for periodic maintenance). However, it should be clearly understood that the scope of this disclosure is not limited to pursuing or achieving any particular advantage, objective or combination of objectives by the hydraulic pumping system 10, hydraulic actuator 14, hydraulic pressure source 12 or annular seal housing 44.

Figure 5:
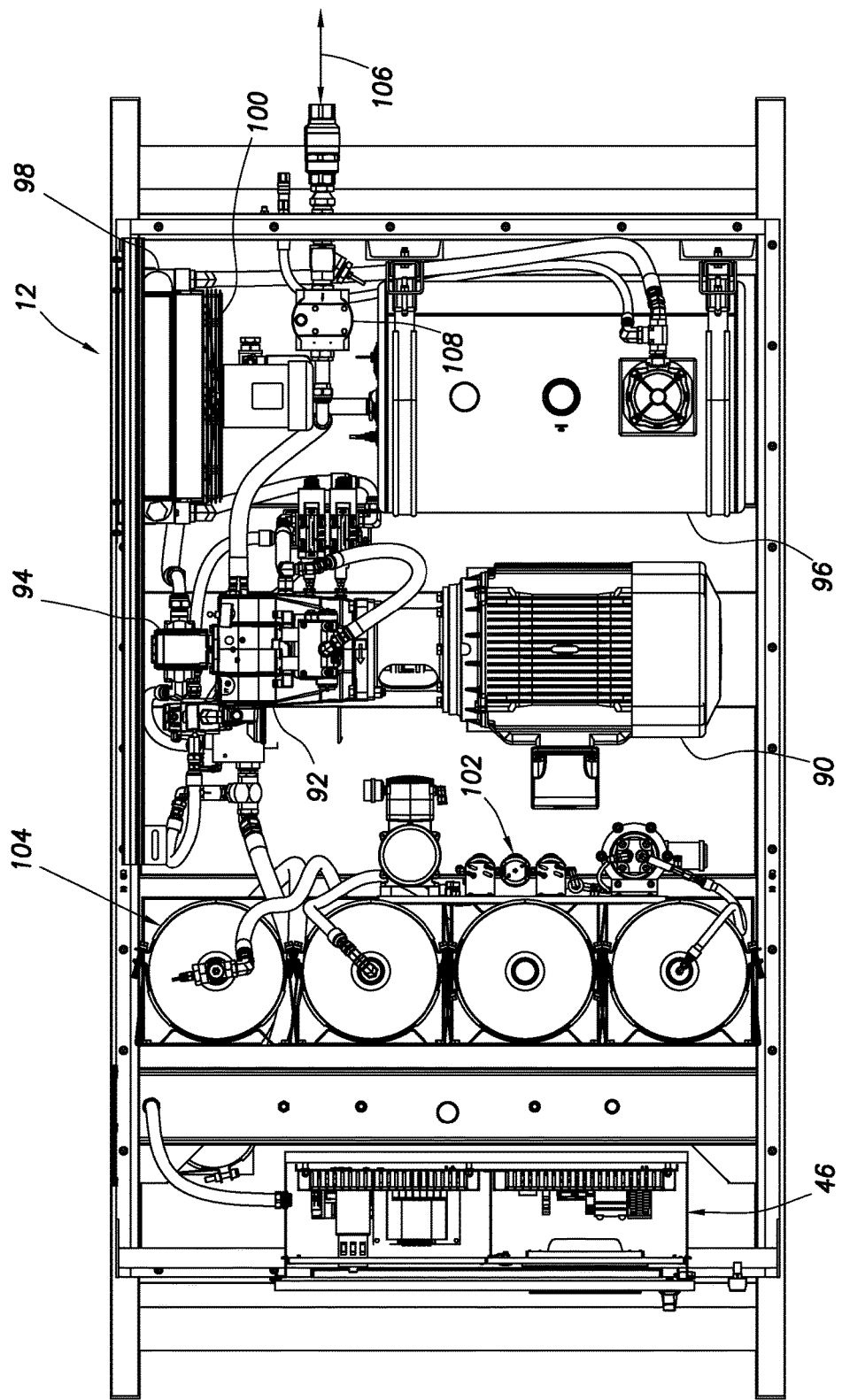
FIG. 5 is a representative top view of an example of a hydraulic pressure source that may be used in the system and method of FIG. 1.

Referring additionally now to FIG. 5, a top view of an example of the hydraulic pressure source 12 is representatively illustrated. In this view, a top cover of the hydraulic pressure source 12 is not illustrated, so that internal components of the hydraulic pressure source 12 are visible.

In the FIG. 5 example, the hydraulic pressure source 12 includes a prime mover 90, a primary hydraulic pump 92, an accessory hydraulic pump 94, a hydraulic fluid reservoir 96, a hydraulic fluid heat radiator 98 with fan 100, a nitrogen concentrator assembly 102, and a gas balancing assembly 104. The control system 46 is included with the hydraulic pressure source 12 in this example.

The prime mover 90 can be a fixed or variable speed electric motor (or any other suitable type of motor or engine). Preferably, the control system 46 controls operation of the prime mover 90 in an efficient manner that minimizes a cost of supplying electricity or fuel to the prime mover 90. This efficient manner may vary, depending on, for example, how a local electric utility company charges for electrical service (e.g., by peak load or by kilowatt hours used). Instead of an electric motor, the prime mover 90 could in other examples be an internal combustion engine, a turbine or positive displacement motor rotated by flow of gas from the well, or any other type of engine or motor. The type of prime mover is not in any way intended to limit the scope of this disclosure.

The primary hydraulic pump 92 is driven by the prime mover 90 and supplies hydraulic fluid 106 under pressure from the gas balancing assembly 104 to the hydraulic actuator 14, in order to raise the piston 52 (and piston rod 54 and rod string 18). A filter 108 filters the hydraulic fluid 106 that flows from the hydraulic actuator 14 to the primary hydraulic pump 92 (flow from the pump to the actuator bypasses the filter).

When the piston 52 (and piston rod 54 and rod string 18) descends, the hydraulic fluid 106 flows back through the primary hydraulic pump 92 to the gas balancing assembly 104. In some examples, this "reverse" flow of the hydraulic fluid 106 can cause a rotor in the prime mover 90 to rotate "backward" and thereby generate electrical power. In such examples, this generated electrical power may be used to offset a portion of the electrical power consumed by the prime mover 90, in order to reduce the cost of supplying electricity to the prime mover. However, the scope of this disclosure is not limited to generation of electrical power by reverse flow of the hydraulic fluid 106 through the primary hydraulic pump 92.

The accessory hydraulic pump 94 can be used to initially charge the gas balancing assembly 104 with the hydraulic fluid 106 and circulate the hydraulic fluid 106 through the radiator 98. The nitrogen concentrator assembly 102 is used to produce pressurized and concentrated nitrogen gas by removal of oxygen from air (that is, non-cryogenically). In other examples, cryogenic nitrogen or another inert gas source could be used instead of, or in addition to, the nitrogen concentrator assembly 102.

The nitrogen concentrator assembly 102 pressurizes the gas balancing assembly 104 and thereby causes the balance pressure discussed above to be applied to the hydraulic actuator 14. The balance pressure can be varied by control of the nitrogen concentrator assembly 102 by the control system 46. As described more fully below, the control system 46 controls operation of the nitrogen concentrator assembly 102 in response to various operator inputs and sensor measurements.

Figure 6:
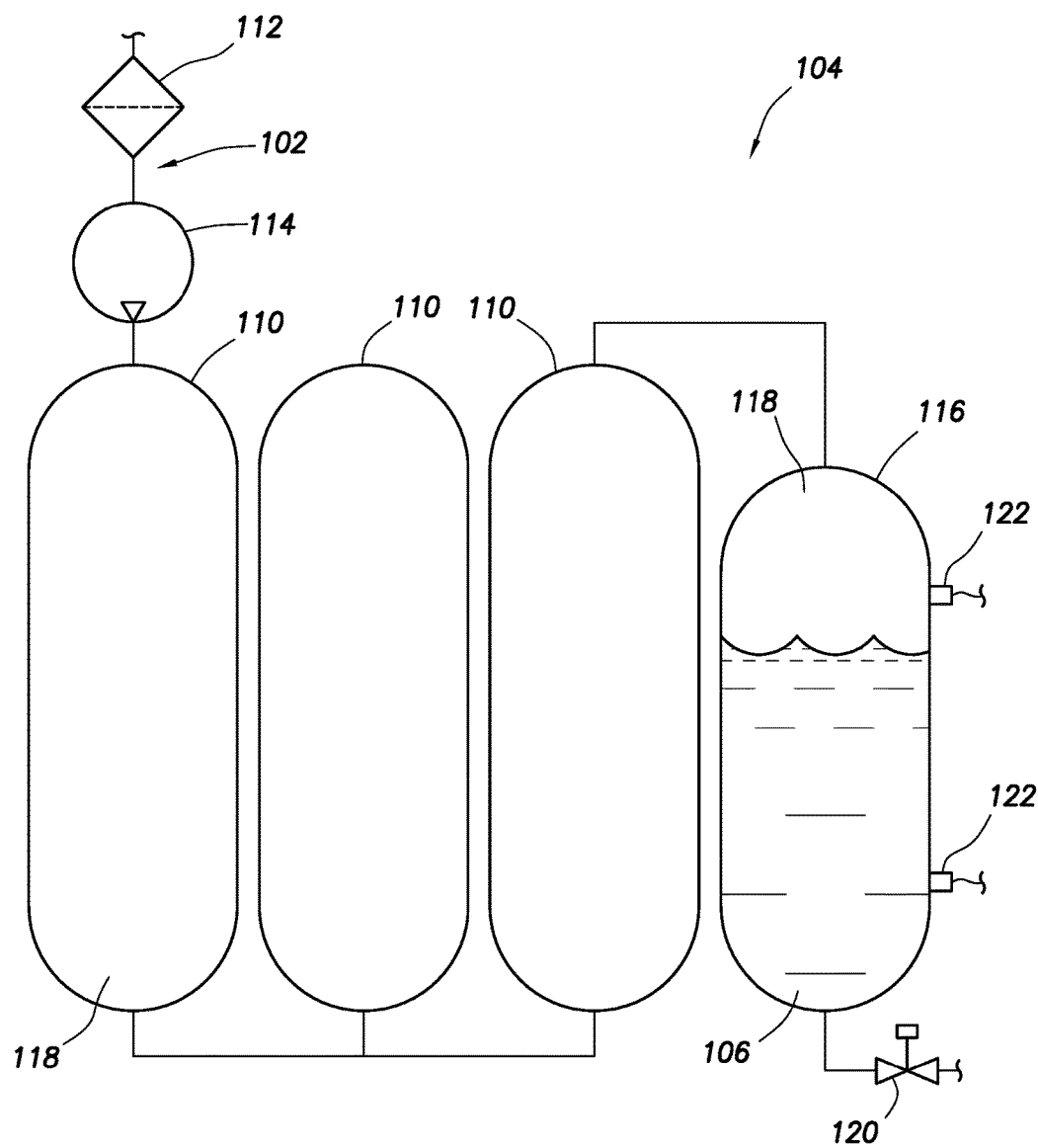
FIG. 6 is a representative diagram of an example of a gas balancing assembly that may be used in the system and method of FIG. 1.

Referring additionally now to FIG. 6, a schematic view of an example of the gas balancing assembly 104 is representatively illustrated with the nitrogen concentrator assembly 102. In this view, it may be seen that the gas balancing assembly 104 includes one or more gas volumes 110 that receive pressurized nitrogen from the nitrogen concentrator assembly 102. The nitrogen concentrator assembly 102 includes a membrane filter 112 and a compressor 114 in this example.

A total volume of the gas volumes 110 can be varied, depending on well conditions, anticipated pressures, a stroke length and piston area of the piston (52 in FIG. 3), etc. Although three gas volumes 110 are depicted in FIG. 6, any number of gas volumes may be used, as desired.

The gas balancing assembly 104 also includes an accumulator 116 connected to the gas volumes 110. Thus, in this example, an upper portion of the accumulator 116 has the pressurized nitrogen gas 118 therein. In other examples, the gas volumes 110 could be combined with the accumulator 116.

A lower portion of the accumulator 116 has the hydraulic fluid 106 therein. Thus, the accumulator 116 is of the type known to those skilled in the art as a "gas over liquid" accumulator. However, in this example, there is no barrier (such as, a bladder or piston) separating the nitrogen gas 118 from the hydraulic fluid 106 in the accumulator 116. Thus, the hydraulic fluid 106 is in direct contact with the nitrogen gas 118 in the accumulator 116, and maintenance requirements for the accumulator 116 are reduced or eliminated (due at least to the absence of a barrier between the nitrogen gas 118 and the hydraulic fluid 106).

A suitable hydraulic fluid for use in the accumulator 116 in direct contact with the nitrogen gas 118 is a polyalkylene glycol (PAG) synthetic oil, such as SYNLUBE P12 marketed by American Chemical Technologies, Inc. of Fowlerville, Mich. USA. However, other enhancements thereof and other hydraulic fluids may be used without departing from the scope of this disclosure.

The compressor 114 pressurizes the nitrogen gas 118, and this pressure is applied to the hydraulic fluid 106 in the accumulator 116. A valve 120 (such as, a pilot operated control valve) selectively permits and prevents flow of the hydraulic fluid 106 between the accumulator 116 and the primary hydraulic pump 92. The valve 120 is open while the hydraulic pressure source 12 is being used to reciprocate the rod string 18 (thereby allowing the hydraulic fluid 106 to flow back and forth between the accumulator 116 and the hydraulic actuator 14), and is otherwise normally closed. The control system 46 can control operation of the valve 120.

One or more liquid level sensors 122 on the accumulator 116 detect whether a level of the hydraulic fluid 106 is at upper or lower limits. The hydraulic fluid 106 level typically should not (although at times it may) rise above the upper limit when the piston (52 in FIG. 3) displaces to its lower stroke extent in the cylinder (50 in FIG. 3) and triggers a sensor (70 in FIG. 3), and the hydraulic fluid 106 level typically should not (although at times it may) fall below the lower limit when the piston (52 in FIG. 3) rises to its upper stroke extent and triggers a sensor (70 in FIG. 3).

A suitable liquid level sensor for use on the accumulator 116 is an electro-optic level switch model no. ELS-1150XP marketed by Gems Sensors & Controls of Plainville, Conn. USA. However, other types of sensors may be used in keeping with the scope of this disclosure.

The liquid level sensors 122 are connected to the control system 46, which can increase the hydraulic fluid 106 level by operation of the accessory hydraulic pump 94. Typically, a decrease in hydraulic fluid 106 level is constantly occurring via a lubrication case drain of the primary hydraulic pump 92 and other seals of the hydraulic pressure source 12 and hydraulic actuator 14, with this hydraulic fluid 106 being directed back to the radiator 98 and hydraulic fluid reservoir 96. Although two liquid level sensors 122 are depicted in FIG. 6, any number of liquid level sensors (or a single continuous sensor) may be used, as may be desired.

Figure 7:
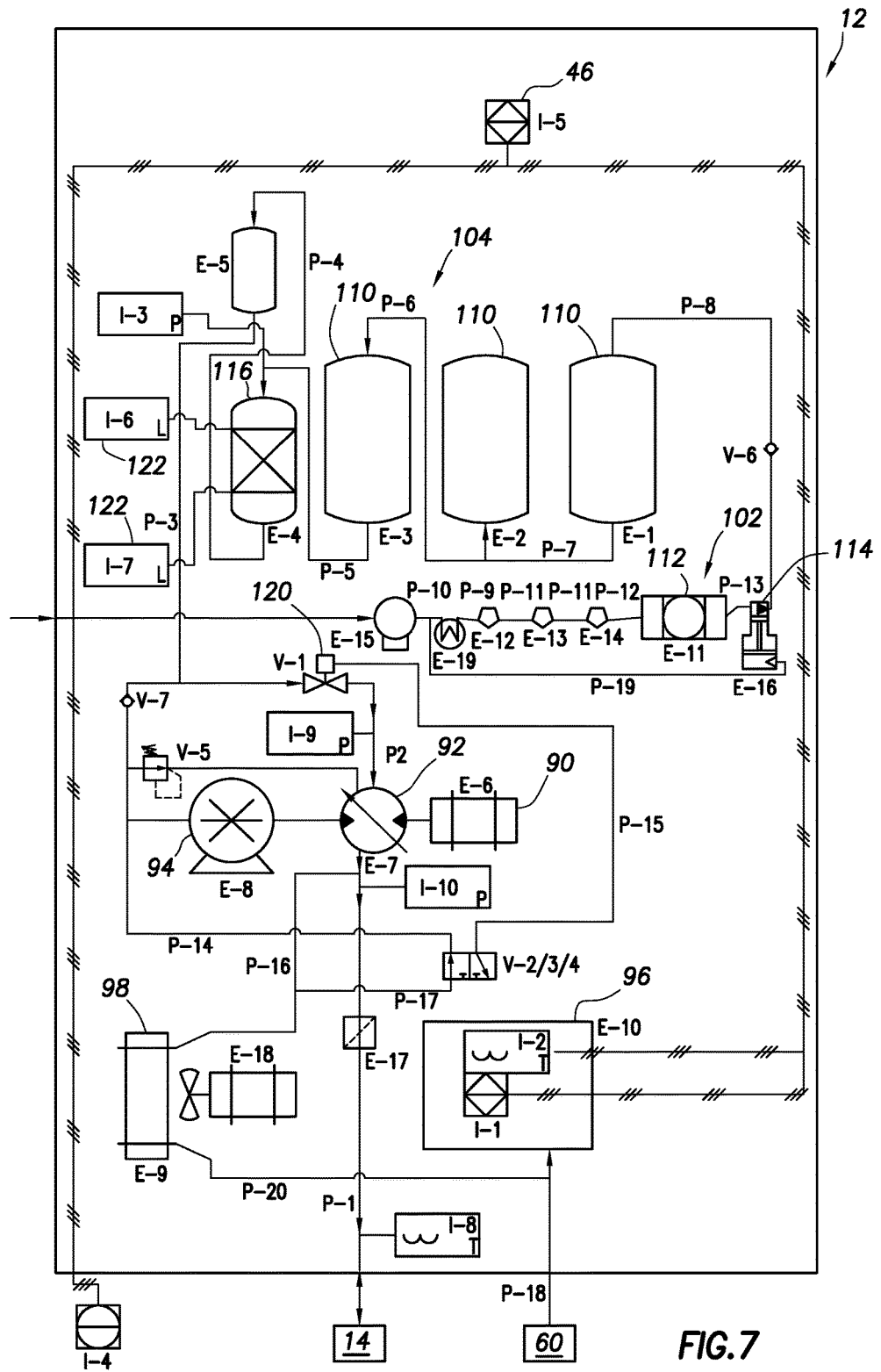
FIG. 7 is an example process and instrumentation diagram for the hydraulic pressure source of FIG. 5.

Referring additionally now to FIG. 7, an example process and instrumentation diagram for the hydraulic pressure source 12 is representatively illustrated. Various components of the hydraulic pressure source 12 are indicated in the diagram using the following symbols in the table below labeled "Equipment."

Equipment
E-1 $N_2$ Volume Bottle (110)
E-2 $N_2$ Volume Bottle (110)
E-3 $N_2$ Volume Bottle (110)
E-4 Accumulator (116)
E-5 Hydraulic Fluid Vessel
E-6 Prime Mover (90)
E-7 Primary Hydraulic Pump (92)
E-8 Accessory Hydraulic Pump (94)
E-9 Radiator (98)
E-10 Hydraulic Fluid Reservoir (96)
E-11 $N_2$ Membrane Filter (112)
E-12 Air Particle Filter ($1^{st}$ stage)
E-13 Air Particle Filter ($2^{nd}$ stage)
E-14 Air Carbon Filter
E-15 Air Compressor
E-16 $N_2$ Booster Compressor (15:1) (114)
E-17 Hydraulic Fluid Filter
E-18 Fan
E-19 Air Cooler
Valves
V-1 Pilot Operated Control Valve V-1 (120)
V-2 Solenoid Valve (for actuation of V-1)
V-3 Charge Shunt Valve
V-4 Safety Relief Valve
V-5 Pressure Reducing Valve
V-6 Reverse Flow Check Valve
V-7 Reverse Flow Check Valve
Instrumentation
I-1 Fluid Level Sensor for Hydraulic Fluid Reservoir E-10 (96)
I-2 Temperature Sensor for Hydraulic Fluid Reservoir E-10 (96)
I-3 $N_2$ Pressure Sensor
I-4 Magnetic Field Sensor(s) (70) on Cylinder (50)
I-5 Control System (46)
I-6 Accumulator E-4 (116) High Fluid Level Sensor (122)
I-7 Accumulator E-4 (116) Low Fluid Level Sensor (122)
I-8 Temperature Sensor on Primary Pump E-7 (92) Outlet
I-9 Pressure Sensor on Primary Hydraulic Pump E-7 (92) Accumulator Side (to prevent cavitation)
I-10 Pressure Sensor on Primary Hydraulic Pump E-7 (92) Outlet (to Cylinder 50)
Piping
P-1 Flow to/from Primary Hydraulic Pump E-7 (92) and Cylinder 50
P-2 Flow from Control Valve V-1 (120) to Primary Pump E-7 (92)
P-3 Flow from Hydraulic Fluid Vessel E-5 to Control Valve V-1 (120)
P-4 Flow from Accumulator E-4 (116) to Hydraulic Vessel E-5
P-5 Flow to/from $N_2$ Volume Bottle E-3 (110) and Accumulator E-4 (116)
P-6 Flow to/from $N_2$ Volume Bottles E-2,3 (110)
P-7 Flow to/from $N_2$ Volume Bottles E-1,2 (110)
P-8 $N_2$ Flow from Compressor E-16 to $N_2$ Volume Bottle E-1 (110)
P-9 Flow from Air Cooler E-19 to Air Particle Filter E-12
P-10 Flow from Air Compressor E-15 to Air Cooler E-19

P-11 Flow from Air Particle Filters E-12,13 to Air Carbon Filter E-14

P-12 Flow from Air Carbon Filter E-14 to $N_2$ Membrane Filter E-11 (112)

P-13 Flow from $N_2$ Membrane Filter E-11 (112) to $N_2$ Booster Compressor E-16

P-14 Flow from Accessory Hydraulic Pump E-8 (94) to Valve Manifold V-2/3/4

P-15 Flow from Valve V-2 to actuate Control Valve V-1 (120)

P-16 Flow from Primary Hydraulic Pump E-7 (92) case drain and controls to Radiator E-9 (98)

P-17 Flow from Valve Manifold V-2/3/4 to Radiator E-9 (98)

P-18 Flow from Cylinder Vent Valve (60) to Reservoir E-10 (96)

P-19 Flow from Air Compressor E-15 to $N_2$ Booster Compressor E-16

P-20 Flow From Radiator E-9 (98) to Hydraulic Fluid Reservoir E-10 (96)

Note that the scope of this disclosure is not limited to any specific details of the hydraulic pressure source 12, or any of the components thereof, as described herein or depicted in the drawings. For example, although the nitrogen booster compressor E-16 is listed above as having a 15:1 ratio, other types of compressors may be used if desired.

In a normal start-up operation, the hydraulic pressure source 12 is powered on, and certain parameters are input to the control system 46 (for example, via a touch screen, keypad, data port, etc.). These parameters can include characteristics of the hydraulic actuator 14 (such as, piston 52 area and maximum stroke length), characteristics of the well (such as, expected minimum and maximum rod string 18 loads, expected well pressure, initial fluid 26 flow rate, etc.), or any other parameters or combination of parameters. Some parameters may already be input to the control system 46 (such as, stored in non-volatile memory), for example, characteristics of the hydraulic pressure source 12 and hydraulic actuator 14 that are not expected to change, or default parameters.

At this point, the piston rod 54 is already connected to the rod string 18, and the hydraulic actuator 14 is installed on the wellhead 16 above the rod BOP stack 42 and the annular seal housing 44. The control valve 120 is closed, thereby preventing communication between the gas balancing assembly 104 and the primary pump 92.

The volumes 110 and accumulator 116 may be purged with nitrogen and optionally pre-charged with pressure prior to the start-up operation. Similarly, lines and volumes in the hydraulic pressure source 12 and the hydraulic actuator 14, and lines between the hydraulic pressure source 12 and the hydraulic actuator 14, may be purged with hydraulic fluid 106 prior to (or as part of) the start-up operation.

The control system 46 determines a minimum volume of the hydraulic fluid 106 that will be needed for reciprocating the piston 52 in the cylinder 50. Alternatively, a default volume of the hydraulic fluid 106 (which volume is appropriate for the actuator 14 characteristics) may be used.

An appropriate volume of the hydraulic fluid 106 (which volume is preferably greater than the minimum needed) is flowed by operation of the accessory pump 94 from the hydraulic fluid reservoir 96 to fill the hydraulic fluid vessel (E-5 in the Equipment Table) and a lower portion of the accumulator 116. The level sensors 122 are used with the control system 46 to verify that an appropriate level of the hydraulic fluid 106 is present in the accumulator 116.

The control system 46 determines an appropriate balance pressure that should be applied, based on, for example, the input parameters. Nominally, the balance pressure can be equal to the expected minimum load exerted by the rod string 18 in operation, divided by the piston area of the piston 52. However, as mentioned above, it may in some circumstances be advantageous to increase or decrease the balance pressure somewhat.

The air compressor (E-15 in the Equipment Table) is activated to supply a flow of pressurized air through the cooler (E-19 in the Equipment Table) and the air filters (E-12, E-13, E-14 in the Equipment Table) to the membrane filter 112. The membrane filter 112 provides a flow of concentrated nitrogen 118 (e.g., by removal of substantially all oxygen from the air) to the booster compressor 114. Note that pressurized air is also supplied to the booster compressor 114 from the compressor E-15 for operation of the booster compressor.

The nitrogen 118 flows from the booster compressor 114 into the volumes 110 and an upper portion of the accumulator 116. The booster compressor 114 elevates a pressure of this nitrogen 118 to the desired balance pressure.

The pressure sensor I-3 monitors the pressure in the gas balancing assembly 104. By virtue of the hydraulic fluid 106 being in contact with the nitrogen 118 in the accumulator 116, the nitrogen pressure is the same as the hydraulic fluid pressure.

Note that each of the sensors (I-1, I-2, I-3, I-4, I-6, I-7, I-8, I-9, I-10 in the Equipment Table) is connected to the control system 46, so that the control system 46 is capable of monitoring parameters sensed by the sensors. Adjustments to the input parameters can be made by the control system 46 in response to measurements made by the sensors if needed to maintain a desired condition (such as, efficient and economical operation), or to mitigate an undesired condition (such as, pump-off or pump-pound). Such adjustments may be made manually (for example, based on user input), or automatically (for example, based on instructions or programs stored in the control system 46 memory), or a combination of manually and automatically (for example, using a program that initiates automatic control in response to a manual input).

The piston 52, piston rod 54 and rod string 18 can now be raised by opening the control valve 120 and operating the primary hydraulic pump 92. When the control valve 120 is opened, the balance pressure is applied to the annular chamber 56 below the piston 52 (see FIG. 2). Depending on the selected level of the balance pressure, the balance pressure applied to the annular chamber 56 will typically not cause the piston 52 and attached rod string 18 to displace upward, but some upward displacement of the rod string 18 may be desired in some circumstances.

The primary hydraulic pump 92 flows pressurized hydraulic fluid 106 from the accumulator 116 and hydraulic fluid vessel E-5 to the annular chamber 56 of the hydraulic actuator 14, and increases the hydraulic fluid pressure therein, thereby causing the piston 52 and attached rod string 18 to rise in the wellbore 16 and operate the downhole pump 20 (see FIG. 1). A hydraulic fluid pressure increase (greater than the balance pressure) needed to displace the piston 52 upwardly to its upper stroke extent is dependent on various factors (such as, rod string 18 weight, friction in the well and in the hydraulic actuator 14, piston 52 area, well fluid 26 density, depth to the downhole pump 20, etc.).

Nevertheless, the control system 46 can operate the primary hydraulic pump 92, so that the hydraulic fluid 106 flows into the annular chamber 56 until the piston 52 is displaced to its upper stroke extent. Such displacement of the piston 52 is indicated to the control system 46 by the sensor(s) 70 of the hydraulic actuator 14. Note that the control system 46 can operate the primary hydraulic pump 92 in a manner that avoids an abrupt halt of the piston 52 displacement at the upper stroke extent (e.g., by reducing a flow rate of the hydraulic fluid 106 as the piston 52 approaches the upper stroke extent).

The piston 52, piston rod 54 and rod string 18 can then be lowered by ceasing operation of the primary pump 92, and allowing the hydraulic fluid 106 to flow from the annular chamber 56 back through the primary hydraulic pump to the hydraulic fluid vessel E-5 and the accumulator 116. Pressure in the annular chamber 56 below the piston 52 will, thus, return to the balance pressure and the load exerted by the rod string 18 will cause the piston 52 and piston rod 54 to descend in the cylinder 50.

Depending on the level of the balance pressure at this point, the piston 52 may not return to its initial, lowermost position. Instead, the piston 52 typically will descend to a lower stroke extent that avoids pump-pound (e.g., bottoming out of the valve rod bushing 25 against the valve rod guide 23), while providing for efficient and economical operation. As the piston 52 descends in the cylinder 50 and the hydraulic fluid 106 flows from the annular chamber 56 to the hydraulic fluid vessel E-5 and accumulator 116, the control system 46 can operate a variable displacement swash plate (not shown separately) in the primary hydraulic pump 92 in a manner that avoids an abrupt halt of the piston 52 displacement at the lower stroke extent (e.g., by reducing a flow rate of the hydraulic fluid as the piston 52 approaches the lower stroke extent).

The "reverse" flow of the hydraulic fluid 106 through the primary hydraulic pump 92 could, in some examples, cause the primary hydraulic pump 92 to rotate backward and thereby cause the prime mover 90 (when an electric motor is used) to generate electrical power. Thus, the prime mover 90 can serve as a motor when the hydraulic fluid 106 is pumped to the hydraulic actuator 14, and a generator when the hydraulic fluid is returned to the hydraulic pressure source 12. The generated electrical power may be stored (for example, using batteries, capacitors, etc.) for use by the hydraulic pressure source 12, or the electrical power may be supplied to the local electrical utility (for example, to offset the cost of electrical power supplied to the hydraulic pumping system 10, such as, in situations where the cost is based on demand and/or total usage).

The above-described actions of raising and lowering the piston 52, piston rod 54 and rod string 18 can be repeated indefinitely, in order to reciprocate the rod string 18 in the well and operate the downhole pump 20 to flow the well fluid 26 to the surface. However, it should be understood that variations in operation of the hydraulic pressure source 12 and the hydraulic actuator 14 are to be expected as the pumping operation progresses.

For example, assumptions or estimates may have been made to arrive at certain parameters initially input to the control system 46. After an initial stroking of the hydraulic actuator 14, adjustments may be made automatically or manually (or both) via the control system 46 to account for actual conditions. Such adjustments could include varying the balance pressure, the piston 52 upper or lower stroke extents, the number of piston 52 strokes per minute (spm), etc.

At any point in the pumping operation, actuation of the hydraulic actuator 14 can be stopped, so that displacement of the piston 52 ceases, and a pressure level in the annular chamber 56 (e.g., sensed using the pressure sensor I-10) needed to support the load exerted by the rod string 18 can be measured. The pressure in the accumulator 116 can then be adjusted, if needed, to provide an appropriate balance.

The booster compressor 114 can be automatically operated by the control system 46 to increase the balance pressure when appropriate. For example, based on measurements of the pressure applied to the hydraulic actuator 14 over time (sensed by the pressure sensor I-10), it may be determined that efficiency or economy of operation (or work performed, as described more fully below) would be enhanced by increasing the balance pressure. In such circumstances, the control system 46 can operate the booster compressor 114 to increase the pressure on the accumulator 116 until a desired, increased hydraulic balance pressure is achieved (e.g., as sensed by the pressure sensor I-3).

If a pump-off condition is detected during the pumping operation, a reciprocation speed can be adjusted to avoid this condition. For example, the control system 46 can regulate the hydraulic fluid 106 flow rate (e.g., by varying an operational characteristic of the primary hydraulic pump 92 (such as, by adjusting a swash plate of the primary hydraulic pump 92), varying a rotational speed of the prime mover 90, varying a restriction to flow through the control valve 120, etc.) to decrease a speed of ascent or descent (or both) of the piston 52 in the cylinder 50 if pump-off is detected. Alternatively (or in addition), a stroke length of the piston 52 could be decreased to cause a decrease in the flow rate of the fluid 26 from the well.

If a pump-pound condition is detected during the pumping operation, the lower stroke extent of the piston 52 can be raised, for example, to avoid contact between the valve rod bushing 25 and the valve rod guide 23 in the downhole pump 20. The lower stroke extent can be raised by decreasing the volume of hydraulic fluid 106 returned to the hydraulic pressure source 12 from the hydraulic actuator 14 (e.g., by the control system 46 beginning to change displacement of a swash plate of the primary hydraulic pump 92 and thereby terminate reverse flow when the piston 52 has descended to the raised lower stroke extent). If the detected pump-pound is due to contacting another component of the downhole pump 20 on an upward stroke, the upper stroke extent of the piston 52 can be lowered by decreasing the volume of hydraulic fluid 106 pumped into the hydraulic actuator 14 (e.g., by the control system 46 ceasing operation of the primary hydraulic pump 92 when the piston 52 has ascended to the lowered upper stroke extent).

The balance pressure can be increased at any point in the pumping operation by the control system 46 operating the nitrogen concentrator assembly 102 and the booster compressor 114. The balance pressure can be decreased at any point in the operation by discharging an appropriate volume of the nitrogen 118 in the accumulator 116 and/or the nitrogen volumes 110 to the atmosphere.

The valve manifold V-2/V-3/V-4 can comprise a two position manifold (such as, a National Fluid Power Association (NFPA) D05 manifold marketed by Daman Products Company, Inc. of Mishawaka, Ind. USA) with two position spring return solenoid valves. In one example, a solenoid valve V-2 of the manifold activates V-1 (control valve 120) upon V-2 being energized, and for as long as V-2 remains energized it holds the V-1 control valve (120) open. A sandwich relief valve (such as, an NFPA D05 20 MPa over-pressure safety relief valve marketed by Parker Hannifin Corporation of Cleveland, Ohio USA) can be used with the V-2 valve. Another sandwich relief valve V-4 (such as, adjustable 1 MPa to 7 MPa, set to 2 MPa) of the manifold can function as a charge circuit back-pressure/relief valve placed under a solenoid valve V-3.

Energizing the V-3 solenoid valve of the manifold closes off a 2 MPa relief flow to the radiator 98 (and back to the hydraulic fluid reservoir 96) to cause pressure from the accessory hydraulic pump 94 to rise to the balance pressure and inject a volume of hydraulic fluid 106 into P-3 (for example, to make up losses from the pressurized gas balancing assembly 104, primary hydraulic pump 92 and cylinder 50 circuit), until the level sensor I-6 indicates that sufficient hydraulic fluid is present in the accumulator 116. When V-3 de-energizes, the accessory hydraulic pump 94 output pressure (in P-14) returns to the 2 MPa relief valve setting. Of course, other settings and other types of valve manifolds may be used, without departing from the scope of this disclosure.

As mentioned above, certain adjustments may be made if a pump-pound condition is detected. In the FIG. 7 example, a pump-pound condition can be detected by monitoring pressure of the hydraulic fluid 106 as sensed using the sensor I-10.

The pump-pound condition will be apparent from fluctuations in pressure sensed by the sensor I-10. For example, when the valve rod bushing 25 strikes the valve rod guide 23 of the downhole pump 20, this will cause an abrupt change in the rod string 18 displacement and the load exerted by the rod string, resulting in a corresponding abrupt change in the piston rod 54 and piston 52 displacement. Such abrupt displacement and load changes will, in turn, produce corresponding pressure changes in the hydraulic fluid 106 flowing from the hydraulic actuator 14 to the hydraulic pressure source 12.

The control system 46 can be programmed to recognize hydraulic fluid pressure fluctuations that are characteristic of a pump-pound condition. For example, pressure fluctuations having a certain range of frequencies or amplitudes (or both) could be characteristic of a pump-pound condition, and if such frequencies or amplitudes are detected in the sensor I-10 output, the control system 46 can cause certain actions to take place in response. The actions could include displaying an alert, sounding an alarm, recording an event record, transmitting an indication of the pump-pound condition to a remote location, initiating a routine to appropriately raise the lower stroke extent of the piston 52, etc.

An action that may be automatically implemented by the control system 46 to raise the lower stroke extent of the piston 52 can include incrementally decreasing the volume of hydraulic fluid 106 returned to the hydraulic pressure source 12 from the hydraulic actuator 14 (e.g., by the control system 46 adjusting the swash plate of the primary hydraulic pump 92 to terminate reverse flow when the piston 52 has descended to the raised lower stroke extent), until the pump-pound condition is no longer detected. If pump-pound is detected on an upward stroke of the piston 52, then a similar set of actions can be initiated by the control system 46 to appropriately lower the upper stroke extent of the piston (e.g., by incrementally decreasing the volume of hydraulic fluid 106 pumped into the hydraulic actuator 14 when the piston 52 is stroked upwardly, until the pump-pound condition is no longer detected). As mentioned above, the upper and lower stroke extents could, in some examples, be adjusted by changing positions of the sensors 70 on the cylinder 50.

Note that pressure fluctuations that are characteristic of a pump-pound condition can change based on a variety of different factors, and the characteristics of pressure fluctuations indicative of a pump-pound condition are not necessarily the same from one well to another. For example, a depth to the downhole pump 20 could affect the amplitude of the pressure fluctuations, and a density of the fluid 26 could affect the frequency of the pressure fluctuations. Therefore, it may be advantageous during the start-up operation to intentionally produce a pump-pound condition, in order to enable detection of pressure fluctuations that are characteristic of the pump-pound condition in that particular well, so that such characteristics can be stored in the control system 46 for use in detecting pump-pound conditions in that particular well. Pressure fluctuations are considered to be a type of vibration of the hydraulic fluid 106.

However, it should be clearly understood that the scope of this disclosure is not limited to use of pressure fluctuation measurements to detect a pump-pound condition. Various other types of vibration measurements can be used to indicate a pump-pound condition, and suitable sensors can be included in the system 10 to sense these other types of vibrations. For example, an acoustic sensor, geophone or seismometer (e.g., a velocity sensor, motion sensor or accelerometer) may be used to sense vibrations resulting from a pump-pound condition. The sensor(s) 70 on the actuator 14 could include such sensors, or separate sensors could be used for such purpose if desired.

As mentioned above, certain adjustments may be made if a pump-off condition is detected. In the FIG. 7 example, a pump-pound condition can be detected by monitoring over time the pressure of the hydraulic fluid 106 as sensed using the sensor I-10, and the displacement of the piston 52 as sensed using the sensor(s) 70.

In operation, pressure of the hydraulic fluid 106 is directly related to the load or force transmitted between the hydraulic actuator 14 and the rod string 18. Force multiplied by displacement equals work. If a pump-off condition occurs, the total work performed during a reciprocation cycle will decrease due, for example, to gas intake to the pump 20 and/or to less fluid 26 being pumped to the surface.

Thus, by monitoring the work performed during individual reciprocation cycles over time, the control system 46 can detect whether a pump-off condition is occurring, and can make appropriate adjustments to mitigate the pump-off condition (such as, by decreasing a reciprocation speed of the hydraulic actuator 14, as discussed above). Such adjustments may be made automatically or manually (or both). Other actions (for example, displaying an alert, sounding an alarm, recording an event record, transmitting an indication of the pump-off condition to a remote location, etc.) may be performed by the control system 46 as an alternative to, or in addition to, the adjustments.

Figure 8A:
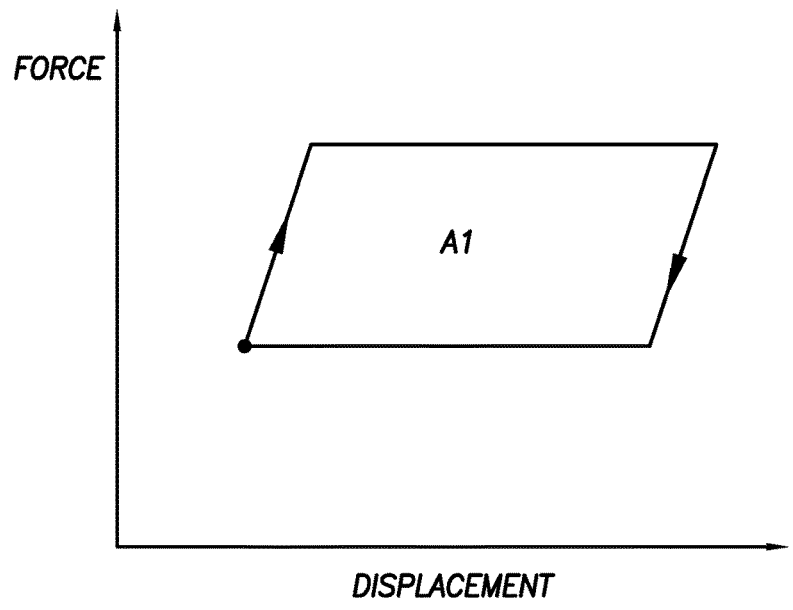
FIGS. 8A & B are representative examples of load versus displacement graphs for the system and method of FIG. 1.

In FIGS. 8A & B, examples of load versus displacement graphs for the system 10 are representatively illustrated. As mentioned above, in operation, load or force transmitted between the hydraulic actuator 14 and the rod string 18 is directly related to hydraulic fluid pressure, and so the graphs could instead be drawn for pressure versus displacement, if desired. Thus, the scope of this disclosure is not limited to any particular technique for determining work performed by the hydraulic actuator 14.

A reciprocation cycle for the hydraulic actuator 14 is depicted in FIG. 8A without a pump-off condition. In the FIG. 8A graph, it may be observed that the force quickly increases as the hydraulic actuator 14 begins to raise the rod string 18, and then the force substantially levels off as the fluid 26 flows from the well (although in practice the force can decrease somewhat due to fluid 26 inertia effects and as less fluid is lifted near the end of the upward stroke). The force then quickly decreases as the hydraulic actuator 14 allows the rod string 18 to descend in the well, and then the force substantially levels off until an end of the downward stroke.

The graph of FIG. 8A has a shape (e.g., generally parallelogram) that is indicative of a reciprocation cycle with no pump-off condition. In actual practice, the idealized parallelogram shape of the FIG. 8A graph will not be exactly produced, but the control system 46 can be programmed to recognize shapes that are indicative of reciprocation cycles with no pump-off condition.

An area $A_1$ of the FIG. 8A graph is representative of the total work performed during this reciprocation cycle (e.g., including a summation of the work performed during the upward and downward strokes). The area $A_1$ can be readily calculated by the control system 46 for comparison to other areas of reciprocation cycles, either prior to or after the FIG. 8A reciprocation cycle.

By comparing the total work performed in different reciprocation cycles, the control system 46 can determine whether and how the work performed has changed. If the total work performed has changed, the control system 46 can make appropriate adjustments to certain parameters, in order to mitigate any undesired conditions, or to enhance any desired conditions.

Figure 8B:
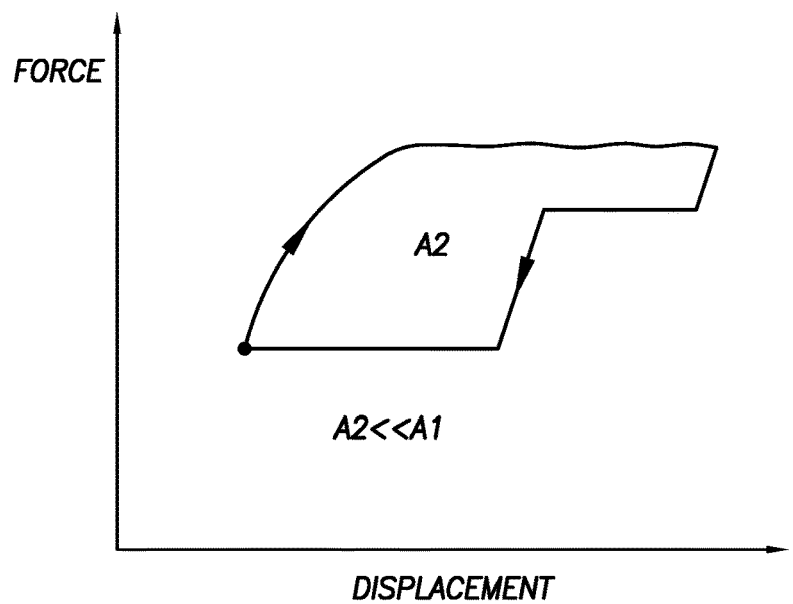

In FIG. 8B, the force versus displacement graph for another reciprocation cycle is depicted, in which a pump-off condition is occurring. Note that an area $A_2$ of the FIG. 8B graph is less than the area $A_1$ of the FIG. 8A graph. This indicates that less total work is performed in the FIG. 8B reciprocation cycle, as compared to the FIG. 8A reciprocation cycle.

If the FIG. 8B reciprocation cycle is after the FIG. 8A reciprocation cycle, the control system 46 can recognize that less total work is being performed over time, and can make appropriate adjustments (such as, by reducing the reciprocation speed). Such adjustments can be made incrementally, with repeated comparisons of total work performed over time, so that the control system 46 can verify whether the adjustments are accomplishing intended results (e.g., increased total work performed over time, due to reduced pump-off).

If the FIG. 8A reciprocation cycle is after the FIG. 8B reciprocation cycle, the control system 46 can recognize that more work is being performed over time and that, if incremental adjustments are being made, those incremental adjustments should continue. However, the control system 46 can discontinue the adjustments, for example, if other objectives (such as, operational efficiency, economy, etc.) would be reduced if the adjustments continue.

The FIG. 8B graph has a shape that is not indicative of a reciprocation cycle in which a pump-off condition is not occurring. Stated differently, the shape of the FIG. 8B graph (for example, with a rounded upward slope, reduced maximum force on the upward stroke and one or more reductions in force during the upward stroke) is indicative of a pump-off condition. The control system 46 can be programmed to recognize such shapes, so that adjustments can be made to mitigate the pump-off condition.

Similar to the procedure described above for situations (where the control system 46 recognizes a substantial change in total work performed), the control system can incrementally decrease the reciprocation speed if a pump-off condition is detected, until the shape of the force (or pressure) versus displacement graph for a reciprocation cycle does not indicate pump-off. If force (or pressure) versus displacement graphs initially do not indicate a pump-off condition, the control system 46 can incrementally increase the reciprocation speed (to thereby increase a rate of production), until the shape of the graph for a reciprocation cycle does begin to indicate pump-off, at which point the control system can incrementally decrease the reciprocation speed until the shape of the graph does not indicate pump-off. In this manner, production rate can be maximized, without any sustained pump-off condition.

It will be readily appreciated that the graphs shown in FIGS. 8A and 8B are visual illustrations of measured force or pressure with respect to measured displacement of the piston 52 and rod string 18. If automatic adjustment of any of the hydraulic actuator 14 operating parameters, e.g., reciprocation rate, maximum stroke extent, etc. are implemented by the control system 46, actual graphs may not be constructed or displayed; the control system 46 may detect the numerical or other equivalent of the "shape" of a graph by implementing suitable detection and control processes therein in response to measurements from any one or more of the various sensors described above.

Referring additionally now to FIG. 9, another example of the seal assembly 78 in the annular seal housing 44 is representatively illustrated. In this example, the seal assembly 78 includes multiple stacked seal cartridges 130 for providing effective redundant annular sealing about the piston rod 54. Labyrinth rings 132 are included at either end of the seal assembly 78 for excluding debris, and radial bearings 134 are positioned between the labyrinth rings and the seal cartridges 130 for maintaining consistent radial spacing between the seal assembly and the piston rod 54.

A wiper ring 136 may be included in the seal assembly 78 above the seal cartridges 130 for maintaining the lubricant 86 (see FIG. 4) in the annular chamber 82. Seals 138 on an exterior of the seal assembly 78 sealingly engage an interior of the annular seal housing 44, and a debris excluder 140 isolates the seals 138 from any debris in the interior of the annular seal housing 44.

The labyrinth rings 132 may comprise single-turn or multiple-turn rings that contact and slidingly engage the piston rod 54. Whether single-turn or multiple-turn rings are used, preferably each labyrinth ring 132 comprises multiple stacked ring layers to provide a labyrinthine path for any debris to negotiate in order to traverse the labyrinth ring. The labyrinth rings 132 also effectively scrape debris and films from an exterior surface of the piston rod 54, thereby preventing such substances from interfering with sealing engagement between the seal cartridges 130 and the piston rod exterior surface. Suitable labyrinth rings for use in the seal assembly 78 are the Laminar Seal Rings available from the Smalley Steel Ring Company of Lake Zurich, Ill. USA.

The radial bearings 134 are precisely dimensioned to evenly space apart the seal assembly 78 from the piston rod 54. Preferably, the radial bearings 134 are tough, durable and have relatively low sliding friction against the exterior surface of the piston rod 54. A suitable material for use in the radial bearings 134 is poly-ether-ether-ketone (PEEK), optionally combined with other material to provide, for example, enhanced abrasion resistance, reduced friction, increased strength, etc.

The wiper ring 136 is not necessarily configured for sealing against a substantial pressure differential, but is mainly used for providing isolation between the lubricant 86 in the annular chamber 82, and fluid, grease, etc., exposed to the seal cartridges 130. Suitable materials for the wiper ring 136 include nitrile and fluorocarbon rubber.

The seals 138 are static annular seals between the seal assembly 78 and the annular seal housing 44. The seals 138 may be, for example, O-rings made of nitrile or fluorocarbon rubber.

The debris excluder 140 is configured for preventing debris from entering an annular space between the seal assembly 78 and the annular seal housing 44. Suitable materials for the debris excluder 140 include nitrile and fluorocarbon rubber.

Referring additionally now to FIG. 10, an enlarged scale cross-sectional view of one of the seal cartridges 130 is representatively illustrated, apart from the seal assembly 78 of FIG. 9. In this view it may be more clearly seen that each seal cartridge 130 includes a separate seal carrier 142 on which both an internal dynamic seal 144 and an external static seal 146 are mounted.

The seal carrier 142 is preferably made of a substantially rigid material, such as steel or another metal or metal alloy. The rigidity of the seal carrier 142 provides structural isolation between the seals 144, 146 of adjacent seal cartridges 130, so that each seal cartridge 130 operates independently of the other seal cartridges.

The dynamic seal 144 is positioned in an annular recess 148 formed in the seal carrier 142. The dynamic seal 144 slidingly and sealingly engages the exterior surface of the piston rod 54, and also sealingly engages the seal carrier 142 in the recess 148. Since the piston rod 54 displaces relative to the dynamic seal 144 as the dynamic seal seals against the piston rod, the dynamic seal 144 is preferably made of a tough, durable and relatively low sliding friction material, such as poly-ether-ether-ketone (PEEK).

The static seal 146 is positioned in an annular recess 150 formed on the seal carrier 142. The static seal 146 seals between the seal carrier 142 and a housing 152 of the seal assembly 78 (see FIG. 9). The static seal 146 may be an O-ring, and may be made of a suitable material, such as nitrile or fluorocarbon rubber.

Figure 11:
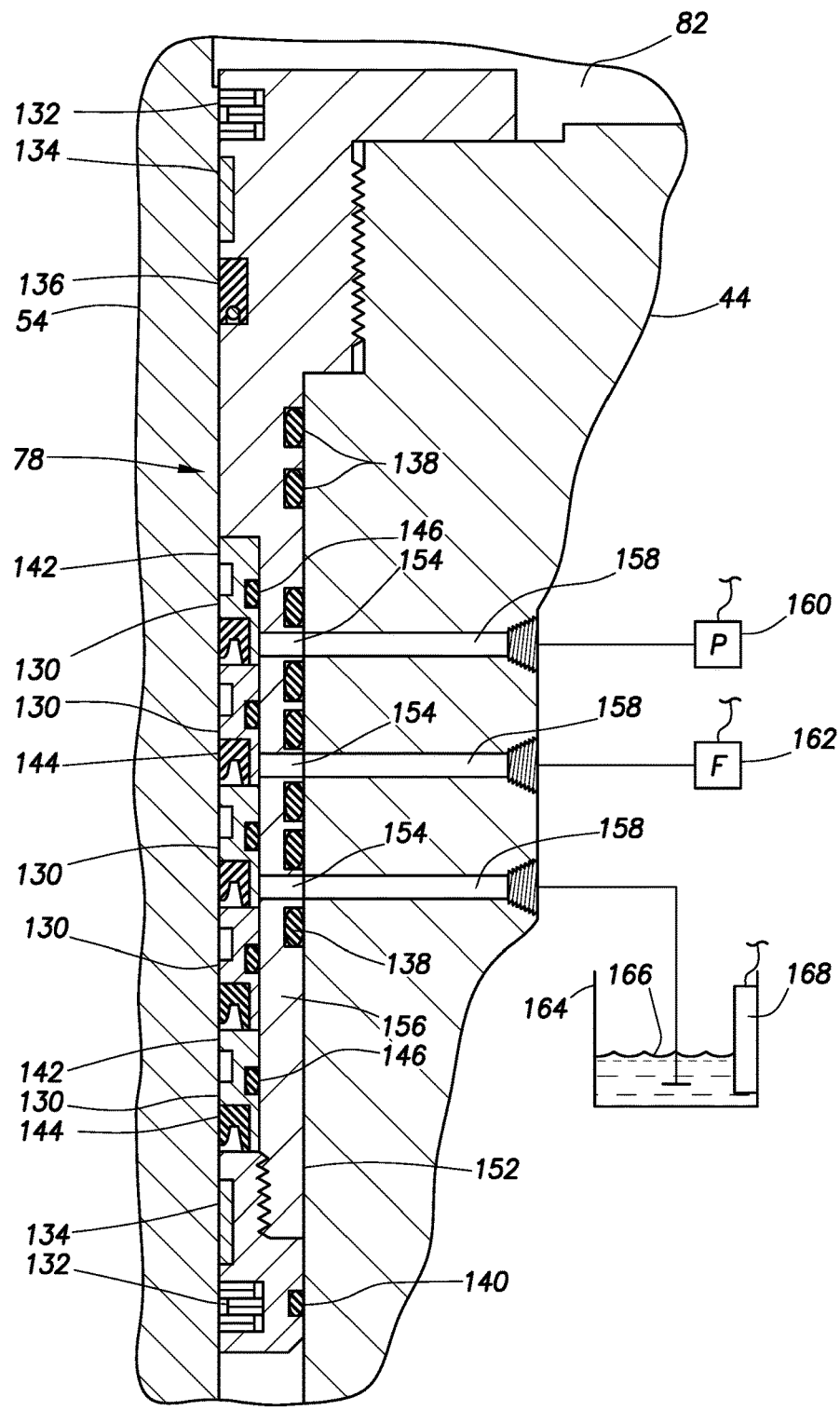
FIG. 11 is a representative cross-sectional view of another example of the seal assembly.

Referring additionally now to FIG. 11, another example of the seal assembly 78 is representatively illustrated. The FIG. 11 example is similar in many respects to the FIG. 9 seal assembly 78 example, but the FIG. 11 example includes additional seal cartridges 130 (a total of five seal cartridges 130), and has additional capabilities for monitoring and controlling operation of the hydraulic pumping system 10.

In the FIG. 11 example, ports 154 provide for fluid communication through a sidewall 156 of the housing 152. Each of the ports 154 extends from an exterior of the housing 152 to an interior of the housing 152 between an adjacent pair of the static seals 146. Three of the ports 154 are depicted in FIG. 11, but any number of ports may be provided in other examples.

Fluid passages 158 provide for fluid communication between an exterior of the annular seal housing 44 and the respective ports 154. Any number of the fluid passages 158 may be provided, and it is not necessary for the number of fluid passages 158 to be the same as the number of ports 154.

Note that the ports 154 and fluid passages 158 are also in fluid communication with the interior of the seal assembly 78 between respective adjacent pairs of the dynamic seals 144. Thus, the ports 154 and fluid passages 158 can be used to monitor fluid pressure, fluid types and other fluid characteristics between the dynamic seals 144, for example, to determine whether any leakage past a dynamic seal 144 has occurred, how much leakage has occurred, what type of fluid is between the dynamic seals 144, etc. This fluid communication can also, or alternatively, be used to affect conditions between the dynamic seals 144 and in the interior of the seal assembly 78, for example, to inject a fluid (such as a solvent) into the interior of the seal assembly 78, to change fluid pressure between the dynamic seals 144 (e.g., to energize one or more of the dynamic seals 144), to change a pressure differential across one or more of the dynamic seals 144, etc. Therefore, the scope of this disclosure is not limited to any particular function, purpose or use for fluid communication with the interior of the seal assembly 78 between the dynamic seals 144.

As depicted in FIG. 11, a pressure sensor 160 is connected to one of the ports 154 via a respective fluid passage 158. A fluid type sensor 162 is connected to another port 154 via a respective fluid passage 158. A reservoir 164 receives a fluid 166 (such as, the fluid 26, a liquid or gas, etc.) from another fluid passage 158 and respective port 154. A fluid level sensor 168 senses a level of the fluid 166 in the reservoir 164.

The pressure sensor 160 can be used to monitor pressure between an adjacent pair of the dynamic seals 144. A pressure increase measured by the pressure sensor 160 can indicate leakage past one or more of the dynamic seals 144. A suitable sensor for use as the pressure sensor 160 is the PX309 Series pressure transducer marketed by Omega Engineering, Inc. of Stamford, Conn. USA, although other pressure sensors may be used in keeping with the principles of this disclosure.

The fluid type sensor 162 can be used to indicate when or if a particular type of fluid is present between an adjacent pair of the dynamic seals 144. A suitable sensor for use as the fluid type sensor 162 is the SNIFFIT sensor marketed by Neptune Oceanographics Limited of Charlbury, United Kingdom, although other fluid type sensors may be used in keeping with the principles of this disclosure.

If the fluid type sensor 162 can detect the presence of hydrocarbon fluids, then an output of the fluid type sensor 162 would indicate if well fluid 26 has leaked past the dynamic seal(s) 144 formerly isolating the respective port 154 from fluid communication with the wellbore 28. As another example, if the fluid type sensor 162 can detect the presence of the lubricant injected into the annular chamber 82, then an output of the fluid type sensor 162 would indicate if the lubricant has leaked past the dynamic seal(s) 144 formerly isolating the respective port 154 from fluid communication with the annular chamber 82.

The fluid level sensor 168 can be used to indicate a volume or rate of fluid leakage past one or more of the dynamic seals 144. A minimal amount of leakage may be acceptable in some circumstances, but if the leakage exceeds a certain threshold volume or rate, remedial measures may be taken to mitigate the leakage. Suitable continuous and discrete sensors for use as the fluid level sensor 168 are marketed by Omega Engineering, Inc., although other fluid level sensors may be used in keeping with the principles of this disclosure.

The pressure sensor 160, fluid type sensor 162 and/or fluid level sensor 168 can be connected to the control system 46, so that operation of the system 10 can be modified as appropriate in response to measurements made by the sensor(s). For example, operation of the system 10 can be ceased or slowed, and an alert can be sent to an operator, if an output of the pressure sensor 160, fluid type sensor 162 or fluid level sensor 168 indicates that some or all of the dynamic seals 144 are leaking.

Figure 12:
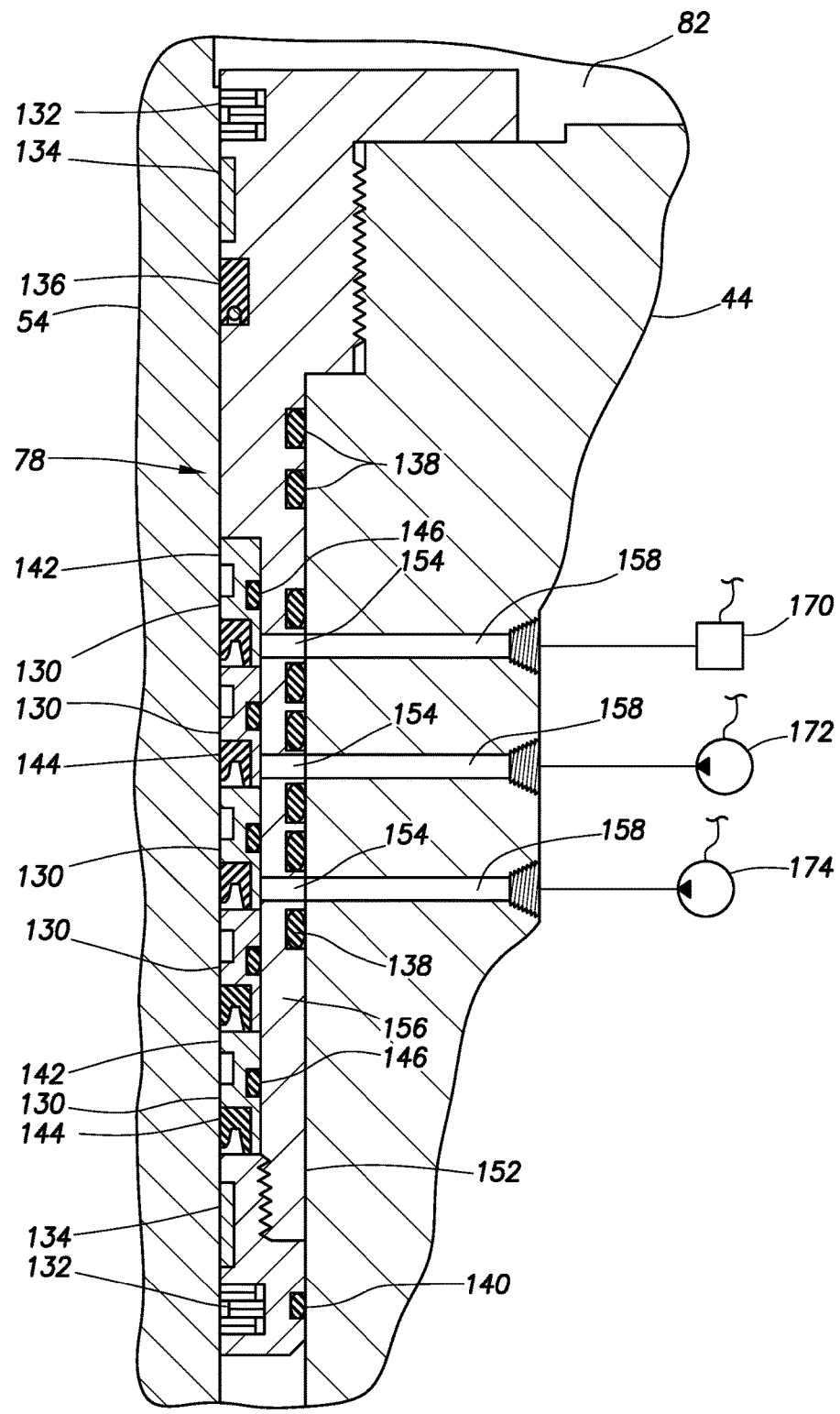
FIG. 12 is a representative cross-sectional view of yet another example of the seal assembly.

Referring additionally now to FIG. 12, yet another example of the seal assembly 78 is representatively illustrated. The FIG. 12 example is similar in most respects to the FIG. 11 example. However, in the FIG. 12 example, an acoustic or other vibratory sensor 170, a pressure source 172 (e.g., a pump) and a fluid source 174 are connected to respective fluid passages 158 and ports 154.

The vibratory sensor 170 can be used to detect when and if an undesired condition exists. For example, a pump-pound condition, wear of the radial bearings 134, a buildup of scale or corrosion on the piston rod 54, etc. may be indicated by increased vibrations measured using the vibratory sensor 170. As with the other sensors 160, 162, 168 described above, the vibratory sensor 170 may be connected to the control system 46, and operation of the system 10 may be modified in response to the output of the vibratory sensor 170.

The pressure source 172 can be used to increase pressure between an adjacent pair of the dynamic seals 144. This increased pressure may cause one or more of the dynamic seals 144 to be increasingly biased into contact with the exterior surface of the piston rod 54. For example, the dynamic seals 144 depicted in FIGS. 9-12 are open at one end to admit pressure therein and assist in radially biasing the dynamic seals 144 against the piston rod 54.

The increased pressure can also, or alternatively, be used to decrease a pressure differential across one or more of the dynamic seals 144, e.g., to reduce wear of the dynamic seal(s) 144 overtime. For example, if a first side of a dynamic seal 144 is exposed to well pressure and an opposite second side of the dynamic seal 144 is exposed to substantially atmospheric pressure, the resulting pressure differential across the dynamic seal 144 can be reduced by increasing the pressure exposed to the second side of the dynamic seal 144.

The fluid source 174 can be used to inject a certain fluid between a respective adjacent pair of the dynamic seals 144. For example, it may be beneficial to inject a solvent between an adjacent pair of the dynamic seals 144, in order to reduce a viscosity and/or surface tension of any well fluid 26 that may adhere to the exterior surface of the piston rod 54, so that the labyrinth rings 132 or wiper ring 136 can more readily remove the well fluid from the piston rod surface.

The fluid source 174 and the pressure source 172 may be the same in some examples. Either or both of the pressure source 172 and the fluid source 174 may be connected to the control system 46, so that their operation may be controlled as appropriate for economical, efficient and/or reliable operation of the system 10.

Note that, although certain seal configurations and materials are described herein for the seal assembly 78, these are just examples of a wide variety of possible configurations and materials that may be used for the seal assembly. Therefore, the scope of this disclosure is not limited to any particular seal configuration, number or combination of seals, or seal materials.

In some examples, different ones of the dynamic seals 144 could comprise respective different materials to achieve certain desirable qualities. In one example, a certain combination of dynamic seals 144 comprising different materials may be selected to seal against a respective combination of well fluid types (e.g., one seal material may seal effectively against liquid hydrocarbons, and another seal material may seal effectively against gaseous hydrocarbons). In another example, a certain combination of dynamic seals 144 comprising different materials may be selected to seal against certain well conditions or debris (e.g., one seal material may seal effectively at high pressure differentials, and another seal material may seal effectively in the presence of abrasive particles).

It may now be fully appreciated that the above description provides significant advancements to the art of artificial lifting for subterranean wells. In various examples described above, pumping of a fluid from a well can be made more efficient, convenient, economical and productive utilizing the hydraulic pumping system 10 and associated methods.

The above disclosure provides to the art a hydraulic pumping system 10 for use with a subterranean well. In one example, the system 10 can include a hydraulic actuator 14 including a piston rod 54 that displaces in response to pressure in the hydraulic actuator 14, a seal assembly 78 that seals about the piston rod 54, the seal assembly 78 including multiple seal cartridges 130, each of the seal cartridges 130 including a dynamic seal 144 that slidingly and sealingly engages the piston rod 54, and each of the seal cartridges 130 further including a static seal 146 that sealingly engages a housing 152 of the seal assembly 78, and at least one port 154 that provides fluid communication between: a) an exterior of the housing 152, and b) an interior of the housing 152 between an adjacent pair of the static seals 146.

The hydraulic pumping system 10 can include a pressure sensor 160 connected to the port 154. The pressure sensor 160 may measure a pressure increase in response to leakage past at least one of the dynamic seals 144.

The hydraulic pumping system 10 can include a fluid type sensor 162 connected to the port 154. The fluid type sensor 162 may detect leakage of a predetermined fluid type past at least one of the dynamic seals 144.

The hydraulic pumping system 10 can include a reservoir 164 that receives fluid 166 from the port 154. The hydraulic pumping system 10 can also include a fluid level sensor 168 that senses a level of the fluid 166 in the reservoir 164.

The hydraulic pumping system 10 can include a pressure source 172 connected to the port 154. The pressure source 172 may increase pressure between an adjacent pair of the dynamic seals 144. The pressure supplied by the pressure source 172 may bias at least one of the dynamic seals 144 against the piston rod 54. The pressure supplied by the pressure source 172 may reduce a pressure differential across at least one of the dynamic seals 144.

A solvent can be injected via the port 154. The solvent may be injected between an adjacent pair of the dynamic seals 144.

Different ones of the dynamic seals 144 may comprise respective different materials.

The piston rod 54 may be connected to a downhole pump 20 via a rod string 18 in the well.

The hydraulic pumping system 10 can include a sensor 160, 162, 168, 170 connected to the port 154, and a control system 46 that controls operation of a hydraulic pressure source 12 connected to the hydraulic actuator 14. The control system 46 may vary operation of the hydraulic pressure source 12 in response to an output of the sensor 160, 162, 168, 170.

A method of pumping well fluid 26 from a subterranean well is also provided to the art by the above disclosure. In one example, the method can comprise preventing leakage of the well fluid 26 from the well by disposing a seal assembly 78 about a piston rod 54 of a hydraulic actuator 14, the seal assembly 78 including multiple seal cartridges 130, each of the seal cartridges 130 including a dynamic seal 144 that slidingly and sealingly engages the piston rod 54, and each of the seal cartridges 130 further including a static seal 146 that sealingly engages a housing 152 of the seal assembly 78; enabling fluid communication through a sidewall 156 of the housing 152 to an interior of the housing 152 between an adjacent pair of the static seals 146; and reciprocably displacing the piston rod 54 in response to pressure variations in the hydraulic actuator 14.

The method can include connecting the piston rod 54 to a downhole pump 20 via a rod string 18 in the well.

The method can include fluidly connecting a sensor 160, 162, 168, 170 to the interior of the housing 152 between the adjacent pair of the static seals 146, and controlling operation of a hydraulic pressure source 12 in response to an output of the sensor 160, 162, 168, 170.

The method can include fluidly connecting a pressure sensor 160 to the interior of the housing 152 between the adjacent pair of the static seals 146. The method can include the pressure sensor 160 measuring a pressure increase in response to leakage past at least one of the dynamic seals 144.

The method can include fluidly connecting a fluid type sensor 162 to the interior of the housing 152 between the adjacent pair of the static seals 146. The method can include the fluid type sensor 162 detecting leakage of a predetermined fluid type past at least one of the dynamic seals 144.

The method can include a reservoir 164 receiving a liquid (e.g., fluid 166) from the interior of the housing 152 between the adjacent pair of the static seals 144. The method can include a fluid level sensor 168 sensing a level of the liquid 166 in the reservoir 164.

The method can include fluidly connecting a pressure source 172 to the interior of the housing 152 between the adjacent pair of the static seals 146. The method can include the pressure source 172 increasing pressure between an adjacent pair of the dynamic seals 144, pressure supplied by the pressure source 172 biasing at least one of the dynamic seals 144 against the piston rod 54, and/or pressure supplied by the pressure source 172 reducing a pressure differential across at least one of the dynamic seals 144.

The method can include injecting a solvent into the interior of the housing 152 between the adjacent pair of the static seals 146. The injecting step may include injecting the solvent between an adjacent pair of the dynamic seals 144.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A hydraulic pumping system for use with a subterranean well, the system comprising:
   a hydraulic actuator including a piston rod that displaces in response to pressure in the hydraulic actuator;
   a seal assembly that seals about the piston rod, the seal assembly including multiple seal cartridges, each of the seal cartridges including a dynamic seal that slidingly and sealingly engages the piston rod, and each of the seal cartridges further including a static seal that sealingly engages a housing of the seal assembly; and
   at least one port that provides fluid communication between: a) an exterior of the housing, and b) an interior of the housing between an adjacent pair of the static seals.

2. The hydraulic pumping system of claim 1, further comprising a pressure sensor connected to the port.

3. The hydraulic pumping system of claim 1, further comprising a fluid type sensor connected to the port.

4. The hydraulic pumping system of claim 3, wherein the fluid type sensor detects leakage of a predetermined fluid type past at least one of the dynamic seals.

5. The hydraulic pumping system of claim 1, further comprising a reservoir that receives fluid from the port.

6. The hydraulic pumping system of claim 1, further comprising a pressure source connected to the port.

7. The hydraulic pumping system of claim 6, wherein pressure supplied by the pressure source reduces a pressure differential across at least one of the dynamic seals.

8. The hydraulic pumping system of claim 1, wherein a solvent is injected via the port.

9. The hydraulic pumping system of claim 1, wherein different ones of the dynamic seals comprise respective different materials.

10. The hydraulic pumping system of claim 1, further comprising a sensor connected to the port, and a control system that controls operation of a hydraulic pressure source connected to the hydraulic actuator, and wherein the control system varies operation of the hydraulic pressure source in response to an output of the sensor.

11. A method of pumping well fluid from a subterranean well, the method comprising:
   preventing leakage of the well fluid from the well by disposing a seal assembly about a piston rod of a hydraulic actuator, the seal assembly including multiple seal cartridges, each of the seal cartridges including a dynamic seal that slidingly and sealingly engages the piston rod, and each of the seal cartridges further including a static seal that sealingly engages a housing of the seal assembly;

enabling fluid communication through a sidewall of the housing to an interior of the housing between an adjacent pair of the static seals; and reciprocably displacing the piston rod in response to pressure variations in the hydraulic actuator.

12. The method of claim 11, further comprising fluidly connecting a sensor to the interior of the housing between the adjacent pair of the static seals, and controlling operation of a hydraulic pressure source in response to an output of the sensor.

13. The method of claim 11, further comprising fluidly connecting a pressure sensor to the interior of the housing between the adjacent pair of the static seals.

14. The method of claim 11, further comprising fluidly connecting a fluid type sensor to the interior of the housing between the adjacent pair of the static seals.

15. The method of claim 14, further comprising the fluid type sensor detecting leakage of a predetermined fluid type past at least one of the dynamic seals.

16. The method of claim 11, further comprising a reservoir receiving a liquid from the interior of the housing between the adjacent pair of the static seals.

17. The method of claim 11, further comprising fluidly connecting a pressure source to the interior of the housing between the adjacent pair of the static seals.

18. The method of claim 17, further comprising pressure supplied by the pressure source reducing a pressure differential across at least one of the dynamic seals.

19. The method of claim 11, further comprising injecting a solvent into the interior of the housing between the adjacent pair of the static seals.

20. The method of claim 11, further comprising connecting the piston rod to a downhole pump via a rod string in the well.

* * * * *